(12) United States Patent
Gunsaulis

(10) Patent No.: US 12,370,513 B2
(45) Date of Patent: Jul. 29, 2025

(54) BATCH PROCESSING OF MATERIAL COLLECTED BY A VACUUM EXCAVATION UNIT

(71) Applicant: The Charles Machine Works, Inc., Perry, OK (US)

(72) Inventor: Floyd R. Gunsaulis, Perry, OK (US)

(73) Assignee: The Charles Works, Inc., Perry, OK (US)

( * ) Notice: Subject to any disclaimer, the term of this patent is extended or adjusted under 35 U.S.C. 154(b) by 959 days.

(21) Appl. No.: 17/501,700

(22) Filed: Oct. 14, 2021

(65) Prior Publication Data

US 2022/0111343 A1  Apr. 14, 2022

Related U.S. Application Data

(60) Provisional application No. 63/091,643, filed on Oct. 14, 2020.

(51) Int. Cl.
| | |
|---|---|
| *B01F 35/00* | (2022.01) |
| *B01F 27/192* | (2022.01) |
| *B01F 27/70* | (2022.01) |
| *B01F 33/502* | (2022.01) |
| *B01F 35/21* | (2022.01) |
| *B01F 35/22* | (2022.01) |
| *B01F 35/221* | (2022.01) |
| *B01F 35/222* | (2022.01) |
| *E02F 3/90* | (2006.01) |
| *G01G 19/52* | (2006.01) |

(52) U.S. Cl.
CPC ........ *B01F 35/2203* (2022.01); *B01F 27/192* (2022.01); *B01F 27/70* (2022.01); *B01F 33/5023* (2022.01); *B01F 35/2116* (2022.01); *B01F 35/2117* (2022.01); *B01F 35/2134* (2022.01); *B01F 35/2135* (2022.01); *B01F 35/2218* (2022.01); *B01F 35/222* (2022.01); *E02F 3/907* (2013.01); *G01G 19/52* (2013.01); *E02F 3/90* (2013.01)

(58) Field of Classification Search
CPC . B01F 35/2203; B01F 35/718; B01F 35/2218
See application file for complete search history.

(56) References Cited

U.S. PATENT DOCUMENTS

| | | |
|---|---|---|
| 9,057,180 B1 | 6/2015 | Sewell |
| 11,059,682 B2 | 7/2021 | Sewell |
| 2006/0013061 A1* | 1/2006 | Bivens ................ B01F 35/2117 366/16 |

* cited by examiner

*Primary Examiner* — Anshu Bhatia
(74) *Attorney, Agent, or Firm* — Tomlinson McKinstry, P.C.

(57) ABSTRACT

A method for converting material within a vacuum tank that contains a mixture of liquid and solid material into a solidified batch of material. The method utilizes various devices to measure different features and properties of the tank and its contents to determine an amount of drying agent to be added to the tank. The method further utilizes various devices and methods for adding the drying agent to the tank and mixing the drying agent with the material within the tank. The method described herein may be completed automatically in response to human input on a handheld display device.

20 Claims, 18 Drawing Sheets

FIG. IIA, FIG. IIB, FIG. IIC, FIG. IID

BATCH PROCESSING OF MATERIAL COLLECTED BY A VACUUM EXCAVATION UNIT

RELATED APPLICATIONS

This application claims the benefit of provisional patent application Ser. No. 63/091,643, authored by Gunsaulis, and filed on Oct. 14, 2020, the entire contents of which are incorporated herein by reference.

DETAILED DESCRIPTION

Figure 1:
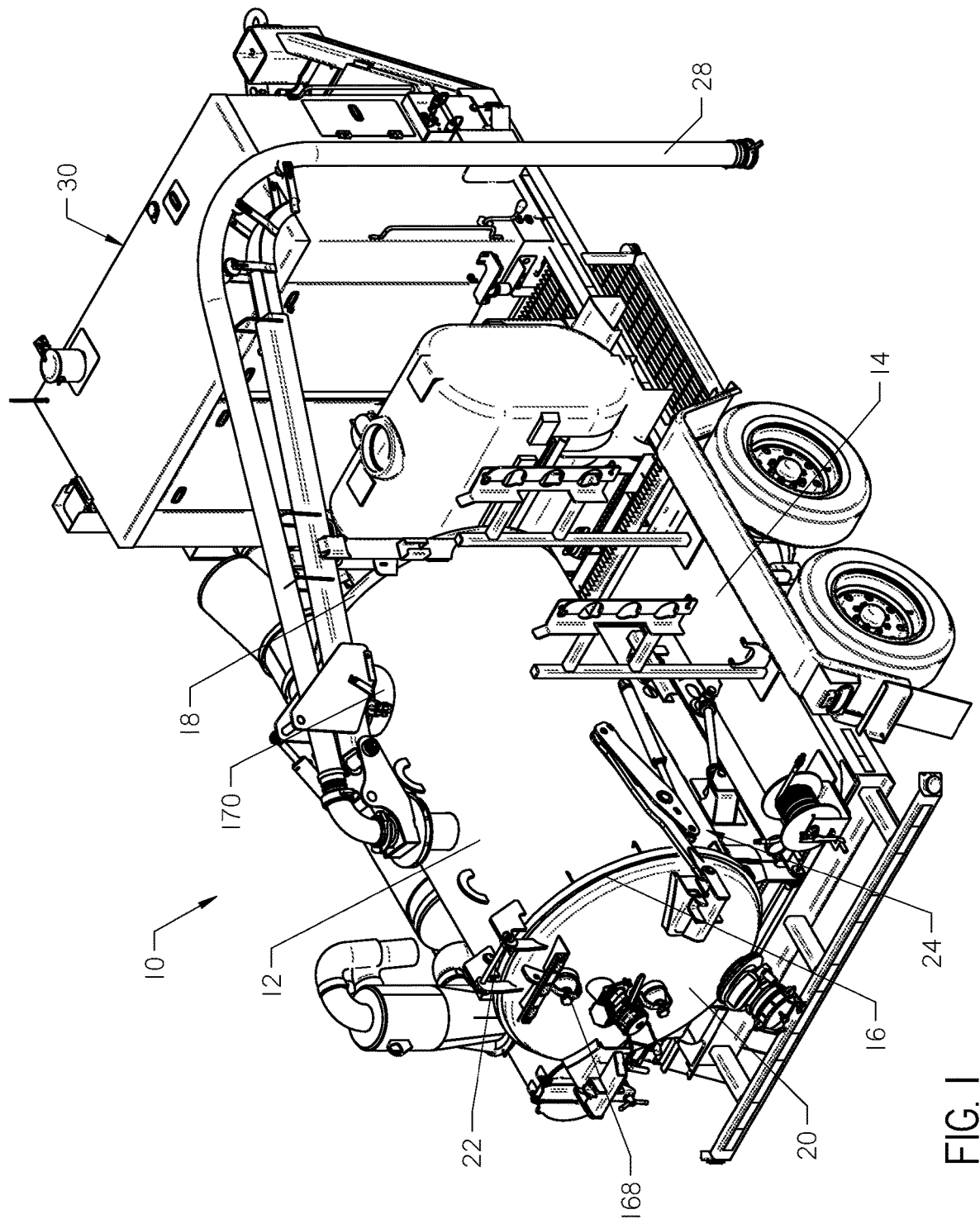
FIG. 1 is a side perspective view of one embodiment of a mobile vacuum excavation unit.

With reference to FIG. 1, an exemplary mobile vacuum excavation unit 10 is shown. Mobile vacuum excavation units, like the unit 10, are used in one or more stages of various underground construction operations, such as bucket excavation, vertical hole drilling, or horizontal directional drilling. The units may be used to evacuate water or soft earth material from around buried utility lines to locate buried lines or expose buried lines in need of repair. The units are also commonly used to clean-up and remove spoils and/or liquid slurry that is the byproduct of fluid-assisted, horizontal directional drilling (HDD) operations.

Continuing with FIG. 1, the unit 10 comprises a large holding tank 12 supported on a trailer 14. In alternative embodiments, the tank may be supported on a truck bed. The tank 12 is generally cylindrical and has an open end 16 and a closed end 18. The open end 16 is sealed closed by a dome-shaped door 20. The door 20 pivots about a bracket 22 as it is lifted open and lowered close by a pair of lifting assemblies 24.

The tank 12 communicates with a blower supported on the trailer 14. The blower may be supported within a power source 30. The blower creates a vacuum within the closed tank 12. A hose 28 interconnects the external ambient air with the interior of the tank 12. Power is supplied to the various features of the unit 10 via the power source 30. The power source 30 may comprise an internal combustion engine or electric motor.

In operation, spoils and/or liquid slurry is sucked into the tank 12 using the hose 28. The spoils and/or liquid slurry usually include a mixture of soil, rocks, gravel, and liquid and is collectively referred to herein as the "material". Once the tank 12 is filled to its designed capacity, the material is commonly moved offsite to a disposal location, or a holding area where it is dumped. If the material contains enough water content that it behaves as a liquid and spreads out when dumped from the tank 12, a premium may be charged at the disposal site to dump the material. The cost of the premium can greatly increase the overall costs of a construction or hydro-excavation project.

The present disclosure provides a system and method for the batch processing of spoils material contained within a vacuum tank. In general, the method comprises the steps of determining the weight of the material in the tank, determining the open volume within the tank, calculating the moisture content of the material in the tank, calculating the amount of drying agent needed to convert the liquid material in the tank to a solidified batch of material, adding the drying agent to the tank, mixing the drying agent with the material, and monitoring the progress of the mixing procedure.

As will be described herein, the various features used to complete each step may communicate with a processor configured to process the desired calculations. The desired calculations may be displayed to a human user on a display device, such as a tablet or smart phone. The various features used to complete each step may also communicate with a controller configured to activate the various features. As will also be described herein, the entire method or desired step may be performed automatically in response to a human input on the display device.

One or more of the individual steps of the method described herein may be used in combination with other systems or methods known in the art and not specifically described herein for processing material in a vacuum tank. The steps described herein may also be completed in a different order, as is practical, than the specific order described herein. The following disclosure describes the various features, embodiments, and methods that may be used to complete each step in the method.

Measuring a Weight of the Material in the Tank

Figure 2:
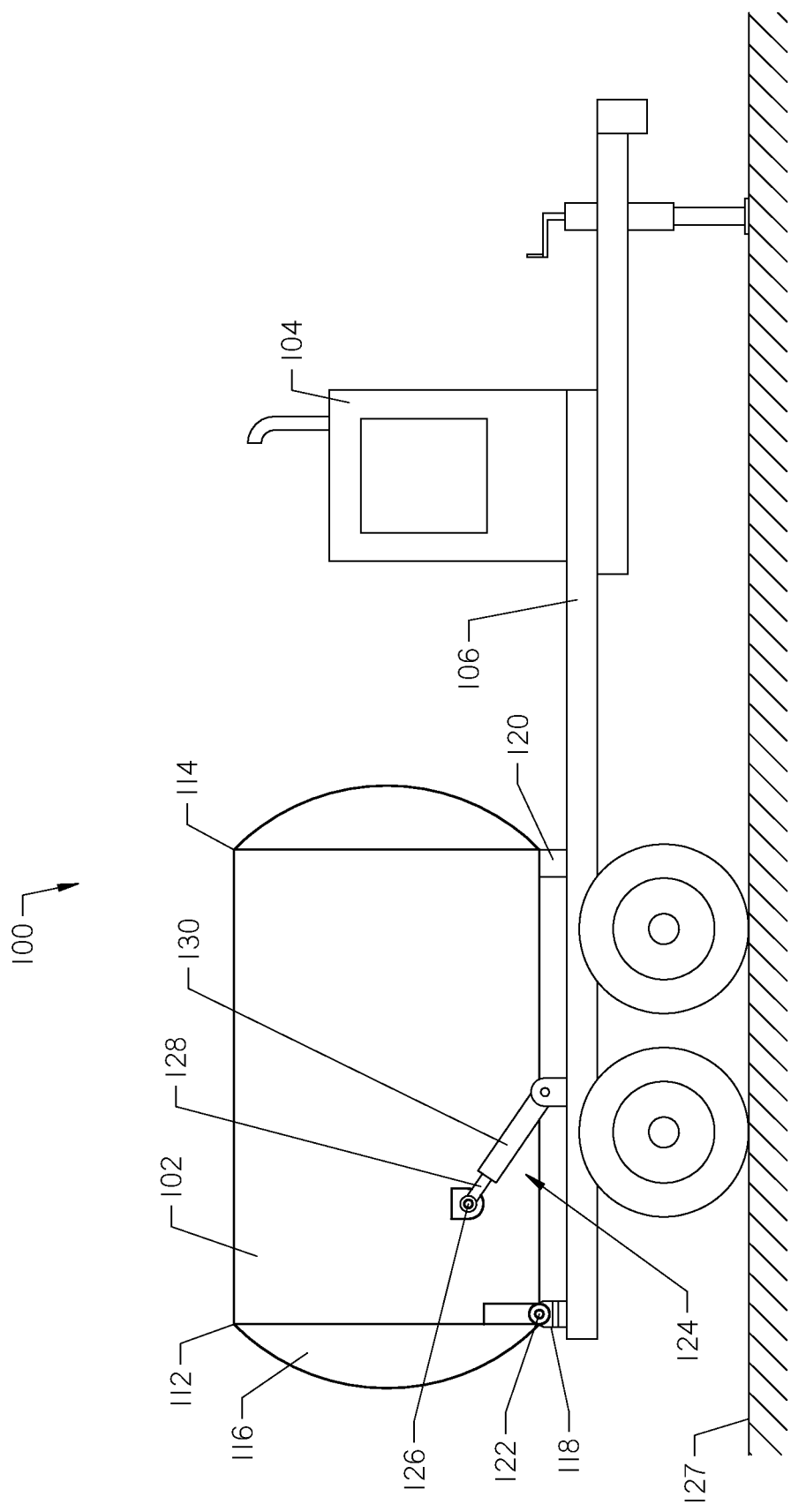
FIG. 2 is a simplified side elevational view of another embodiment of a mobile vacuum excavation unit.
Figure 3:
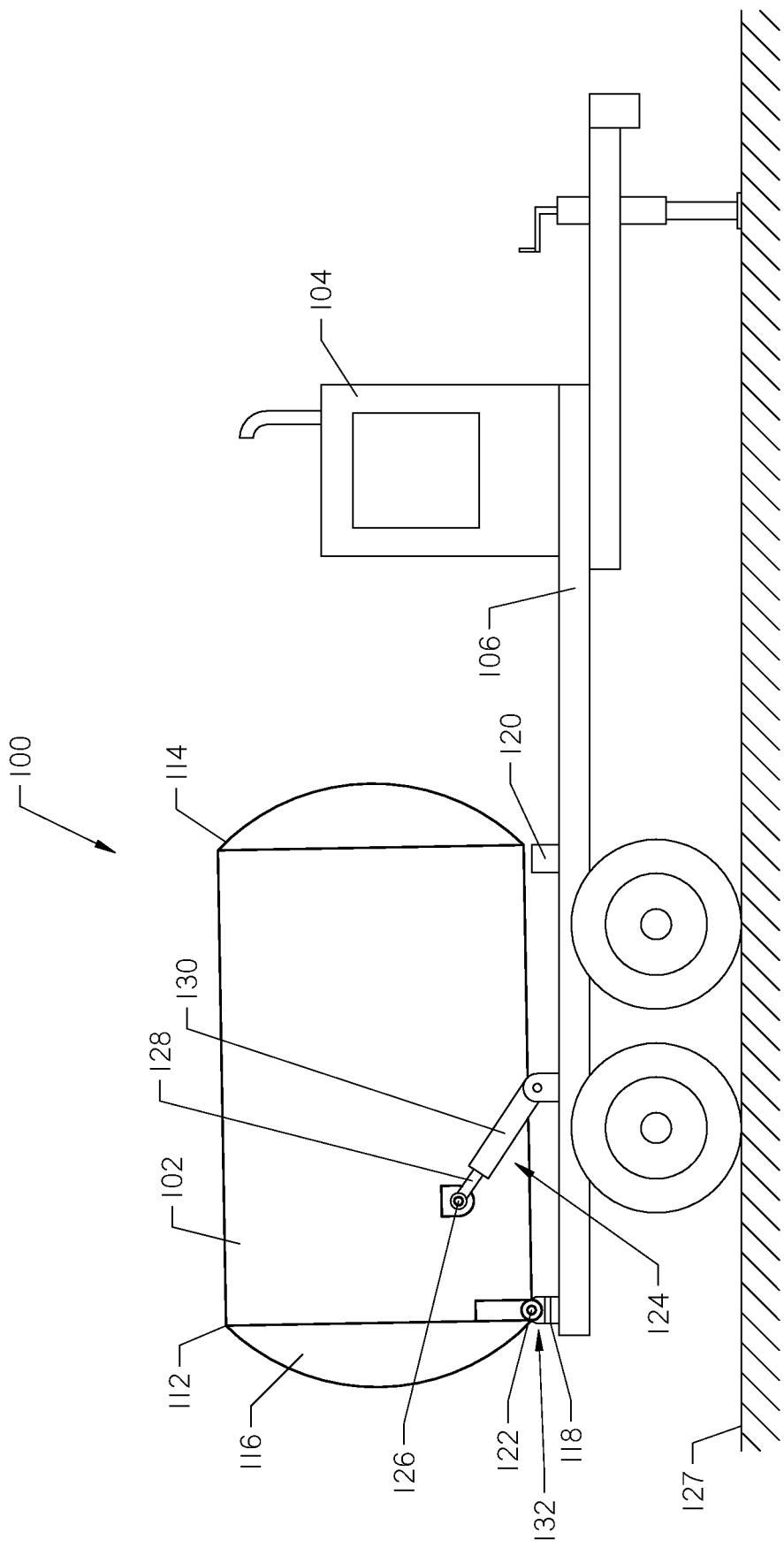
FIG. 3 is the side elevational view of the mobile vacuum excavation unit shown in FIG. 2, but the vacuum tank is shown lifted away from the rear support structure.
Figure 9:
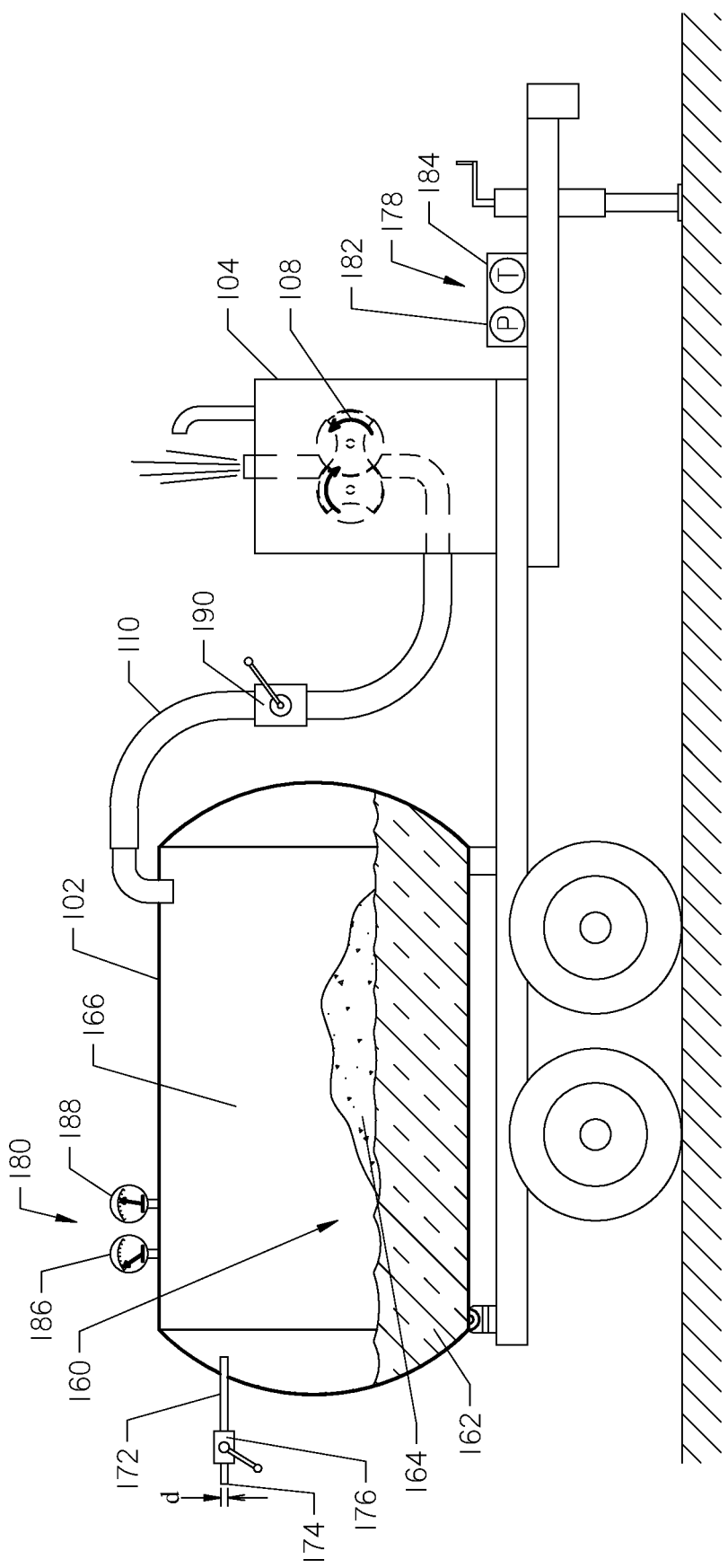
FIG. 9 is the side elevational view of the mobile vacuum evacuation unit shown in FIG. 8, with one embodiment of a system for measuring an amount of open volume within the tank incorporated into the unit.

Turning to FIGS. 2 and 3, a simplified illustration of a vacuum excavation unit 100 is shown. Like the unit 10 shown in FIG. 1, the unit 100 comprises a large holding tank 102 and a power source 104 supported on a trailer 106. A blower 108, shown in FIG. 9, is also supported on the trailer 106 within the power source 104 and is in communication with the power source 104 and the tank 102. The blower 108 communicates with the interior of the tank 102 via a hose 110, as shown in FIG. 9. Various other components of the unit 100, like those components shown in FIG. 1, have been removed for clarity.

The tank 102 comprises opposed open and closed ends 112 and 114. Like the tank 12, the open end 112 is sealed closed by a dome-shaped door 116. A front support 118 pivotally supports the open end 112 of the tank 102, while a rear support 120 releasably supports the closed end 114 of the tank 102. The supports 118 and 120 are shown as blocks, however any type of cradle or support structure may be used. The tank 102 is pivotable about a first pivot point 122 at the front support 118.

Continuing with FIGS. 2 and 3, a first end of a hydraulic cylinder 124 is pivotably attached to the side of the tank 102 between the supports 118 and 120. Such attachment is considered a second pivot point 126. An opposed end of the hydraulic cylinder 124 is rigidly attached to the trailer 106. The hydraulic cylinder 124 comprises a cylinder rod 128 attached to a piston and disposed within a cylinder 130. Extension of the rod 128 lifts the tank 102 away from the rear support 120 and forces the open end 112 of the tank 102 to pivot about the first and second pivot points 122 and 126, as shown in FIG. 3. To dump material from the tank 102, the door 116 is opened and the tank 102 is pivoted forwards about the pivot points 122 and 126, causing material to flow out of the tank 102 and towards a ground surface 127.

One method of calculating the total weight of the material contained within the tank 102 comprises measuring the forces acting on the first and second pivot points 122 and 126 when the closed tank 102 is lifted away from the rear support 120. Once the tank 102 is lifted from the rear support 120, all the weight of the tank 102 and its contents are supported by the first and second pivot points 122 and 126.

Figure 4:
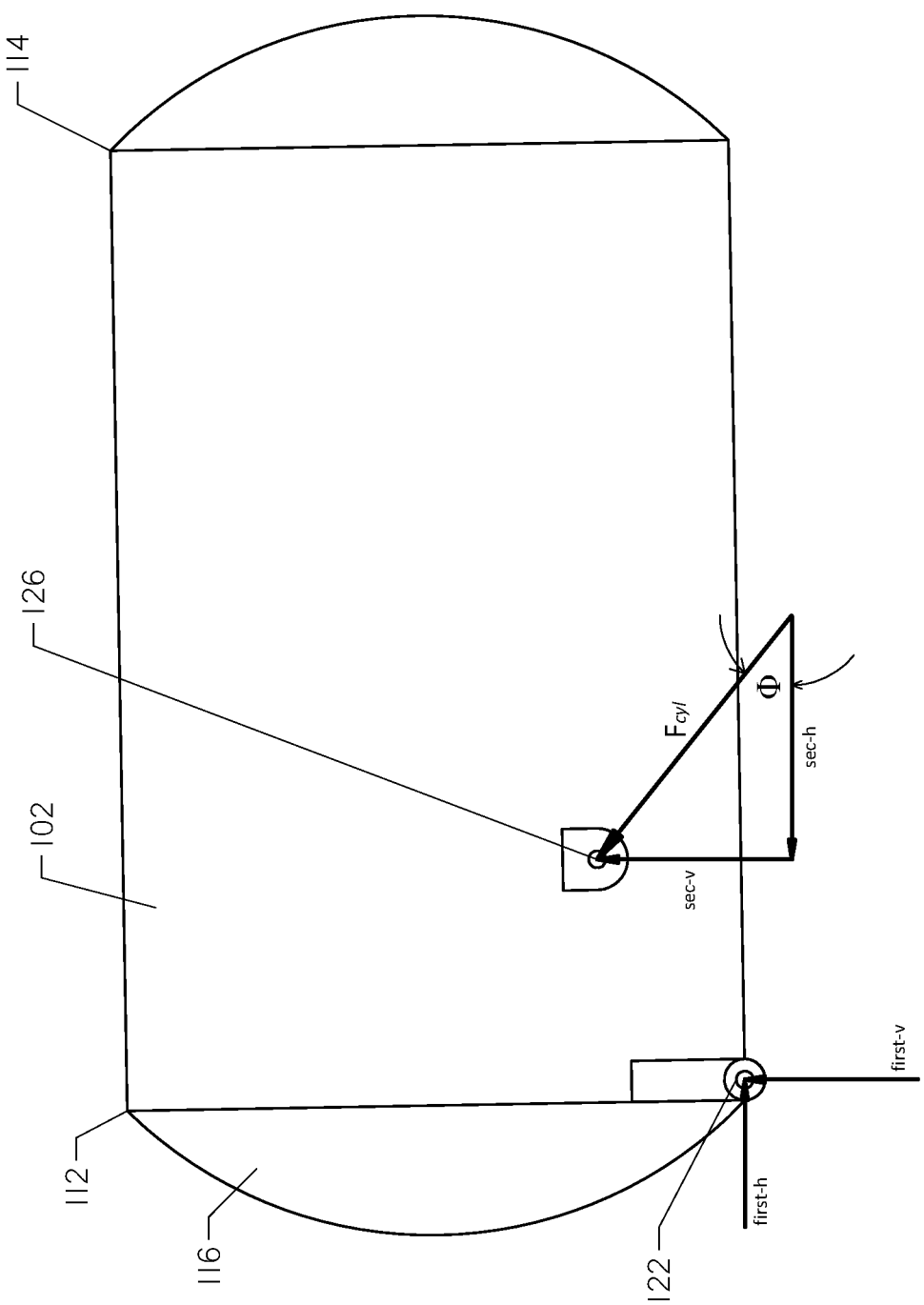
FIG. 4 is a side elevational view of the vacuum tank shown in FIG. 3 with a plurality of arrows referencing forces acting on the tank shown.

With reference to FIG. 4, the force acting on each pivot point 122 and 126 has a vertical and horizontal component. The horizontal force acting on the first pivot point 122 is labeled as $F_{first-h}$ and the vertical force acting on the first pivot point 122 is labeled as $F_{first-v}$ in FIG. 4. Similarly, the horizontal force acting on the second pivot point 126 is labeled $F_{sec-h}$ and the vertical force acting on the second pivot point 126 is labeled as $F_{sec-v}$ in FIG. 4. To measure the total weight of the tank 102 and its contents, the vertical components of the forces at the first and second pivot points 122 and 126 are determined. The total weight of the tank 102 and its contents are the sum of the vertical components $F_{first-v}$ and $F_{sec-v}$.

Figure 7:
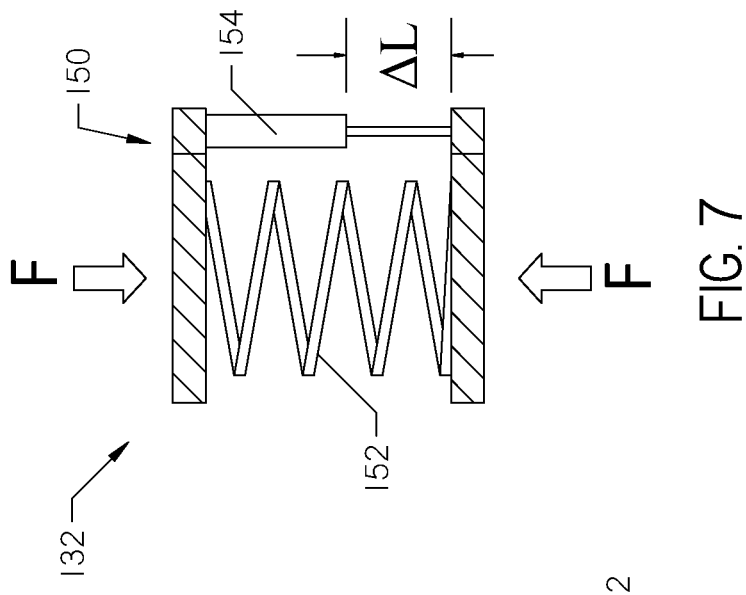
FIG. 7 is a cross-sectional view of another embodiment of a vertical measuring device.
Figure 6:
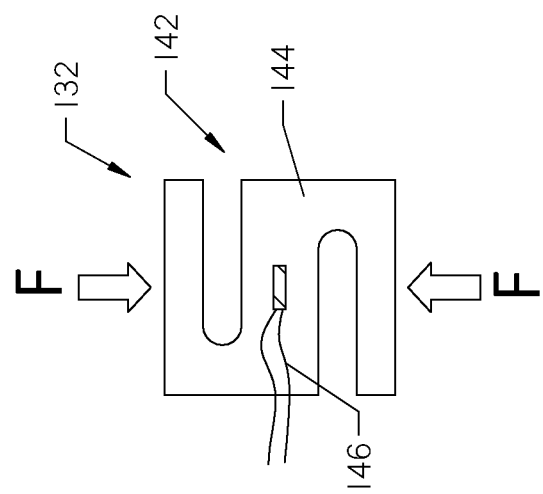
FIG. 6 is a side elevational view of another embodiment of a vertical measuring device.
Figure 5:
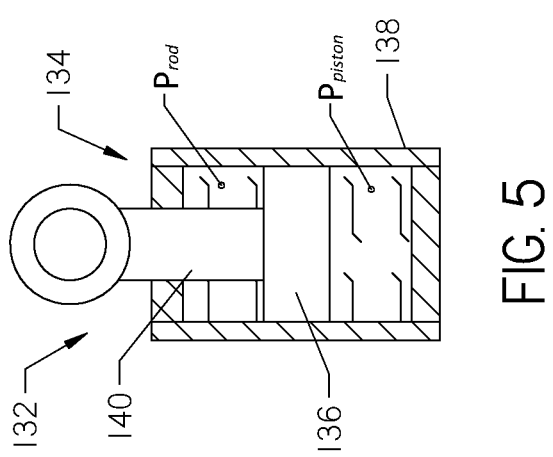
FIG. 5 is a cross-sectional view of one embodiment of a vertical measuring device.

With reference to FIGS. 3-7, the forces acting on the first pivot point 122 can be measured using a vertical load measuring device 132. The vertical load measuring device 132 is incorporated into the front support 118 at the first pivot point 122 and comprises one or more sensors. Examples of vertical load measuring devices 132 are shown in FIGS. 5-7 and described below. The vertical load measuring device 132 is positioned so that the force applied to the first pivot point 122 is also applied to the device 132. In operation, the values measured by the vertical load measuring device 132 are transmitted to a processor and used to find $F_{first-v}$.

Continuing with FIGS. 3 and 4, the forces acting on the second pivot point 126 can be approximated by using the hydraulic cylinder 124. The force applied to the second pivot point by the hydraulic cylinder 124 is labeled as $F_{cyl}$ in FIG. 4. One method of calculating $F_{cyl}$ is by multiplying the known cross-sectional area of the rod 128 by the amount of fluid pressure acting on the rod 128 within the cylinder 130. Once $F_{cyl}$ is found, $F_{sec-v}$ equals the sine of the action angle of the cylinder, Φ, multiplied by $F_{cyl}$. The pressure acting on the rod 128 within the cylinder 130 may be measured by one or more pressure sensors in communication with the hydraulic cylinder 124. The values measured by the sensor are transmitted to a processor configured to calculate $F_{sec-v}$.

Once the processor has calculated $F_{sec-v}$ and $F_{first-v}$, the processor can calculate the weight of the tank 102 and its contents. After the weight of the tank 102 and its contents is determined, the hydraulic cylinder 124 may return the tank 102 to its normal position on the supports 118 and 120.

Once the total weight of the tank 102 and its contents is known, the total weight of just the material contained within the tank 102 can be calculated. The total weight of the material equals the known weight of the empty tank subtracted from the total weight of the tank 102 and its contents. The weight of the air in the open volume of the tank 102 is negligible and therefore not accounted for when finding the total weight of the material within the tank 102.

The processor used to calculate the weight of the material may be included in an operator station supported on the tank 102 or the trailer 106. The operator station may include a display device in communication with the processor and configured to display the weight of the material to an operator. One or more controls may also be included in the operator station for controlling the various features of the unit 100.

Figure 20:
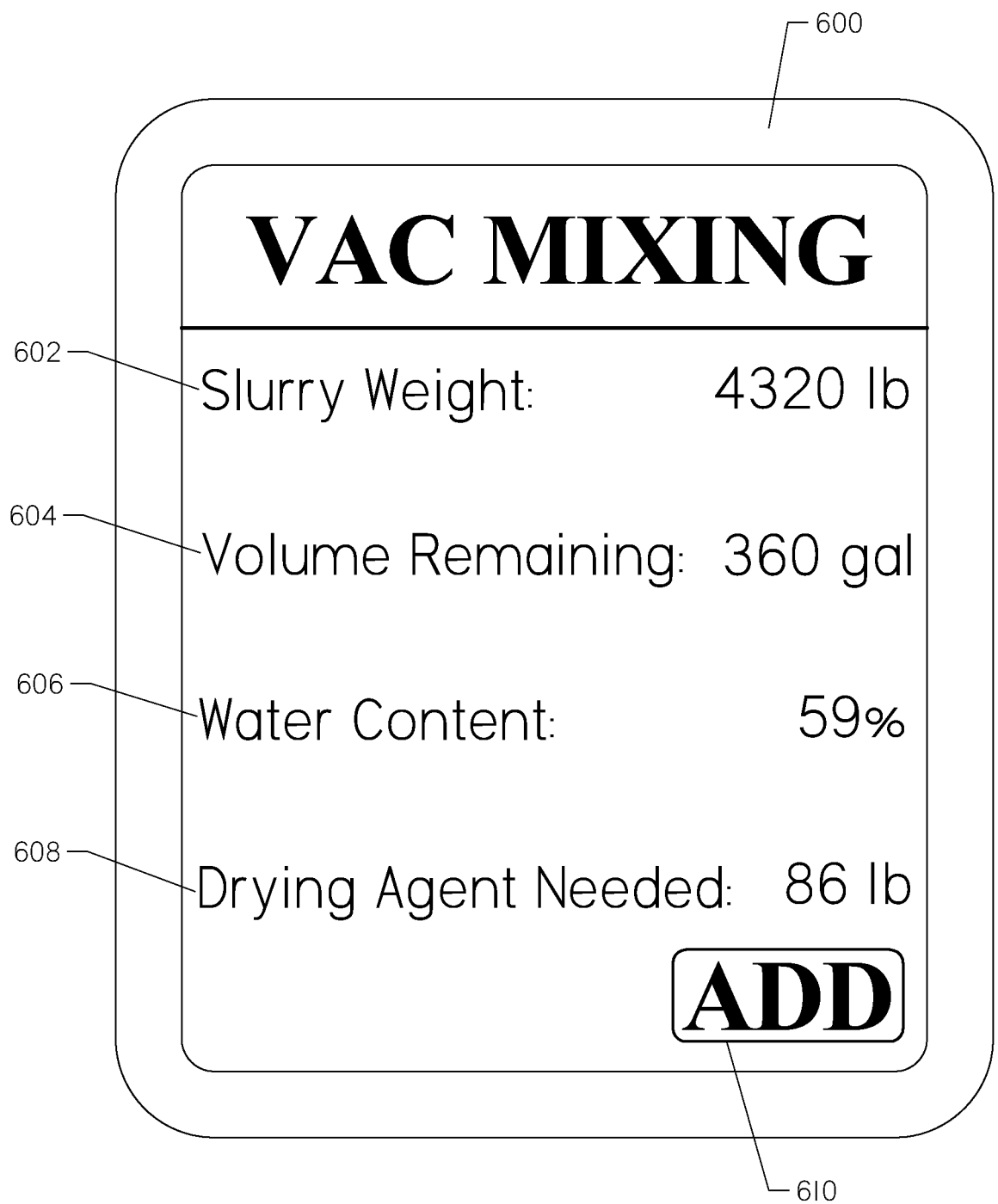
FIG. 20 is a front elevational view of a display device depicting various information.

In alternative embodiments, the processor may be incorporated into a handheld display device, such as a laptop, tablet, or smartphone. The processor may operate using software or an application downloaded on the display device. The display device may also communicate wirelessly with the various controls on the unit 100, such that various apparatuses or sensors included in the unit 100 can be activated or deactivated using the display device. Thus, the display device may function as the controller of the unit 100. An exemplary display device 600 is shown in FIG. 20. The display device 600 may be referred to specifically when describing the method herein, but any type of display device may be used.

Continuing with FIG. 20, the calculated total weight of the material may be displayed for an operator on the display device 600, as shown for example by item 602. In operation, human input on the display device 600 by an operator may activate the hydraulic cylinder 124 and the vertical load measuring device 132. Such activation may cause the steps described herein to happen automatically, resulting in the total weight of the material displayed for an operator on the display device 600 without any additional action taken by the operator.

Turning to FIGS. 5-7, in one embodiment, the vertical load measuring device 132 comprises a hydraulic cylinder 134, as shown for example in FIG. 5. The hydraulic cylinder 134 comprises a piston 136 disposed within a cylinder 138. The piston 136 is reciprocally movable within the cylinder 138 via a piston rod 140. A vertical force applied to the piston rod 140 moves the piston 136 within the cylinder 138. Oil or other non-compressible fluid is disposed within the cylinder 138 on each side of the piston 136. During operation, pressure measurements, $P_{rod}$ and $P_{piston}$, are recorded on each side of the piston 136. The measured values are transmitted to the processor and used to calculate the force applied to the piston rod 140 or $F_{first-v}$.

In another embodiment, the vertical load measuring device 132 comprises a strain gauge type load cell 142, as shown for example in FIG. 6. The strain gauge type load cell 142 comprises a semi-rigid frame 144 which flexes slightly when put under load. A series of strain gauges 146 measure the amount of deflection of the frame 144 which is realized as a change in electrical resistance through the strain gauges 146. The change in electrical resistance is calibrated to correspond to known loads placed on the strain gauge type load cell 142. Thus, the force applied to the strain gauge type load cell 142 can be determined using the measured change in electrical resistance. The measured values are transmitted to the processor and used to calculate $F_{first-v}$.

In another embodiment, the vertical load measuring device 132 comprises a deflection based sensor 150, as shown for example in FIG. 7. The sensor 150 comprises a spring 152, or other flexible member such as an elastomeric compound, and a deflection measuring device 154. The deflection measuring device 154 may be a linear variable differential transformer (LVDT), an optical measuring device, or any other suitable linear measurement device known in the art. In operation, the spring 152 compresses in response to a load placed on the sensor 150. The change in height, $\Delta L$, of the spring 152 is measured by the measuring device 154. The measured values are then transmitted to the processor and the change in height, $\Delta L$ is translated into a force value or $F_{first-v}$. The change in height, $\Delta L$ is calibrated to correspond to known loads placed on the sensor 150.

Turning back to FIG. 4, the direction of the vertical force, $F_{first-v}$ acting against the first pivot point 122 is shown going upwards. However, depending on the location of the central of mass of the material in the tank 102, the reaction force on the first pivot point 122 may be downwards. Thus, the chosen vertical measuring device 132 is preferably capable of measuring force in either direction. The vertical load measuring devices 132 described here are for exemplary purposes. Other known load vertical measuring devices, or other methods of measuring the vertical forces applied to the first and second pivot points 122 and 126 may also be used.

In alternative embodiments, other methods of measuring the weight of the material within the tank 102 may be used. For example, the entire weight of the trailer 106 may be weighed on scales before and after the material is loaded into the tank 102. Alternatively, various trailer load measuring devices based on deflection of the trailer axles or trailer suspension known in the art may be used. Known devices for measuring tongue weight on a trailer may also be used. It would further be possible to measure the change in weight on the axle and add the change in weight on the trailer tongue before and after loading the tank 102 to arrive at the weight of the material within the tank 102. In each embodiment, the measured values are transmitted to the processor and used to calculate the total weight of the material. The calculated weight may then be displayed on the display device 600, as shown in FIG. 20.

As will be described later herein, the weight of the material in the tank 102 is used to determine other properties of the material, such as the material's moisture content.

Measuring the Open Volume within the Tank

Figure 8:
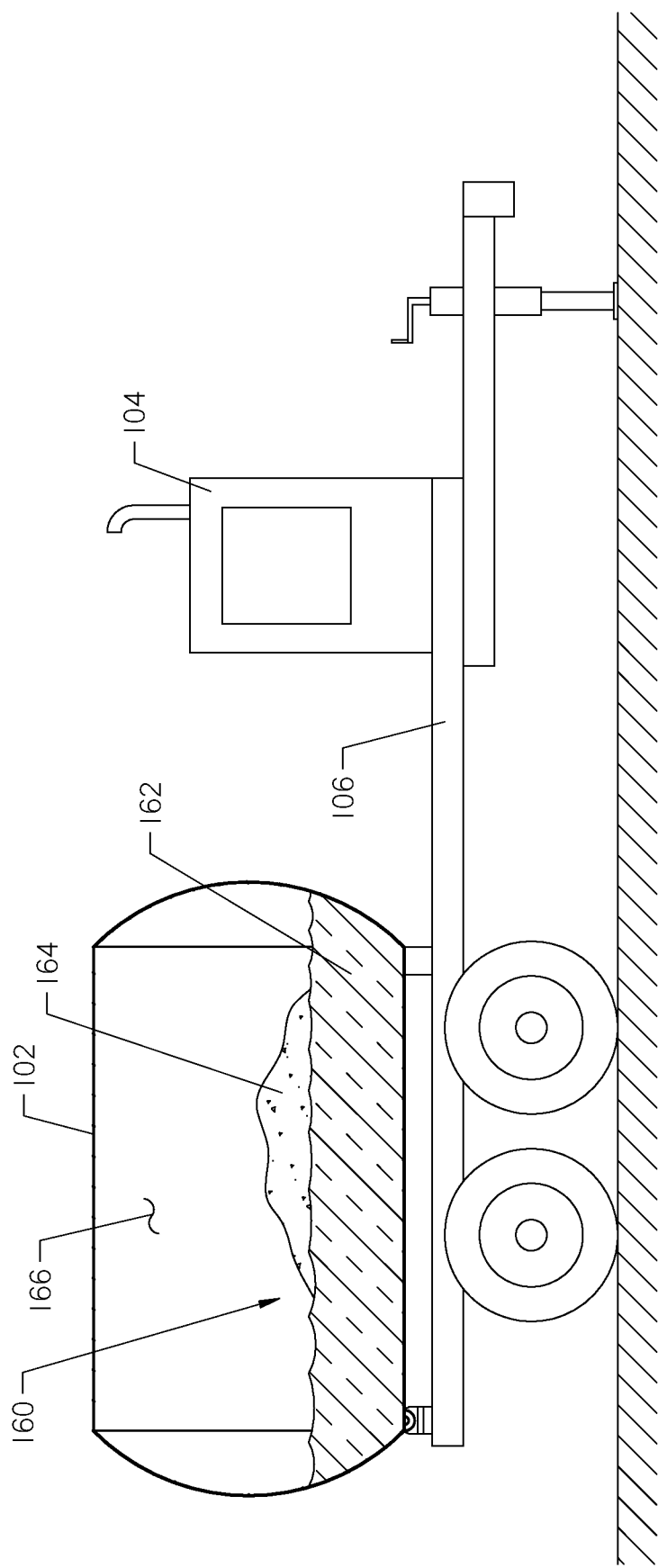
FIG. 8 is the side elevational view of the mobile vacuum evacuation unit shown in FIG. 2, but the vacuum tank is shown in cross-section, exposing material contained within the tank.

Turning to FIG. 8, a cut-away view of the tank 102 is shown exposing material 160 within the tank 102. As discussed above, the material 160 may include a mixture of liquid, soil, rocks, and gravel. The material 160 shown in FIG. 8 comprises liquid material 162 and solid material 164. The liquid material 162 tends to settle at the bottom of the tank 102 while the solid material 164 may pile up in one or more areas of the tank 102. Commonly, the pile(s) of solid material 164 are irregularly shaped, making it difficult to estimate an amount of open or empty volume 166 left in the tank 102.

One method of estimating the amount of open volume 166 within the tank 102 is to view the interior of the tank 102 through one or more clear sight glasses formed in the walls of the tank 102. After viewing the level of material 160 within the tank 102, an operator can make an educated guess about the amount of open volume 166 remaining within the tank 102. An example sight glass 168 is shown in FIG. 1. Sight glasses, however, tend to become coated in soil making them difficult to see through. Further, the sight glasses may not give an accurate view of the varying levels of solid material 164 within the tank 102.

Another method of estimating the open volume 166 within the tank 102 is to view the interior of the tank 102 through an open hatch at the top of the tank 102. An example of a hatch 170 is shown in FIG. 1. In practice, an operator would shut off the blower 108 and open a valve to the tank 102 to allow the tank 102 to come up to atmospheric pressure. Once the tank 102 reached atmospheric pressure, the hatch is opened and the interior of the tank 102 viewed. Like using the sight glass, the operator would merely be making an educated guess about the amount of open volume 166 in the tank 102. These known methods provide only a rough estimate of the open volume 166 within the tank 102 and are subject to errors in the visual interpretation of the operator.

Turning to FIG. 9, one method of more accurately estimating the open volume 166 within the tank 102 is illustrated. The method utilizes a short pipe section 172 attached to the tank 102 and in communication with the interior of the tank 102. A portion of the pipe section 172 projects from the exterior of the tank 102 and has an open end 174 exposed to the ambient external air pressure. A valve 176 is installed within the pipe section 172 and is accessible to an operator. Opening of the valve 176 allows external ambient air surrounding the exterior of the tank 102 to enter the interior of the tank 102, while closing the valve 176 seals the interior of the tank 102 from external air. The pipe section 172 has a known orifice diameter, d.

Continuing with FIG. 9, the method further utilizes one or more external pressure sensors 178 and one or more internal pressure sensors 180. A first barometer or pressure measuring device 182 and a first thermometer 184 are shown positioned outside of the tank 102 in FIG. 9 and in communication with the external ambient air. A second pressure measuring device 186 and a second thermometer 188 are shown supported on the tank 102 and in communication with the air within the interior of the tank 102. In alternative embodiments, other known pressure sensors may be used in place of the pressure sensors shown in FIG. 9. The method further utilizes a valve 190 installed within the hose no interconnecting the tank 102 and the blower 108.

Figure 11:
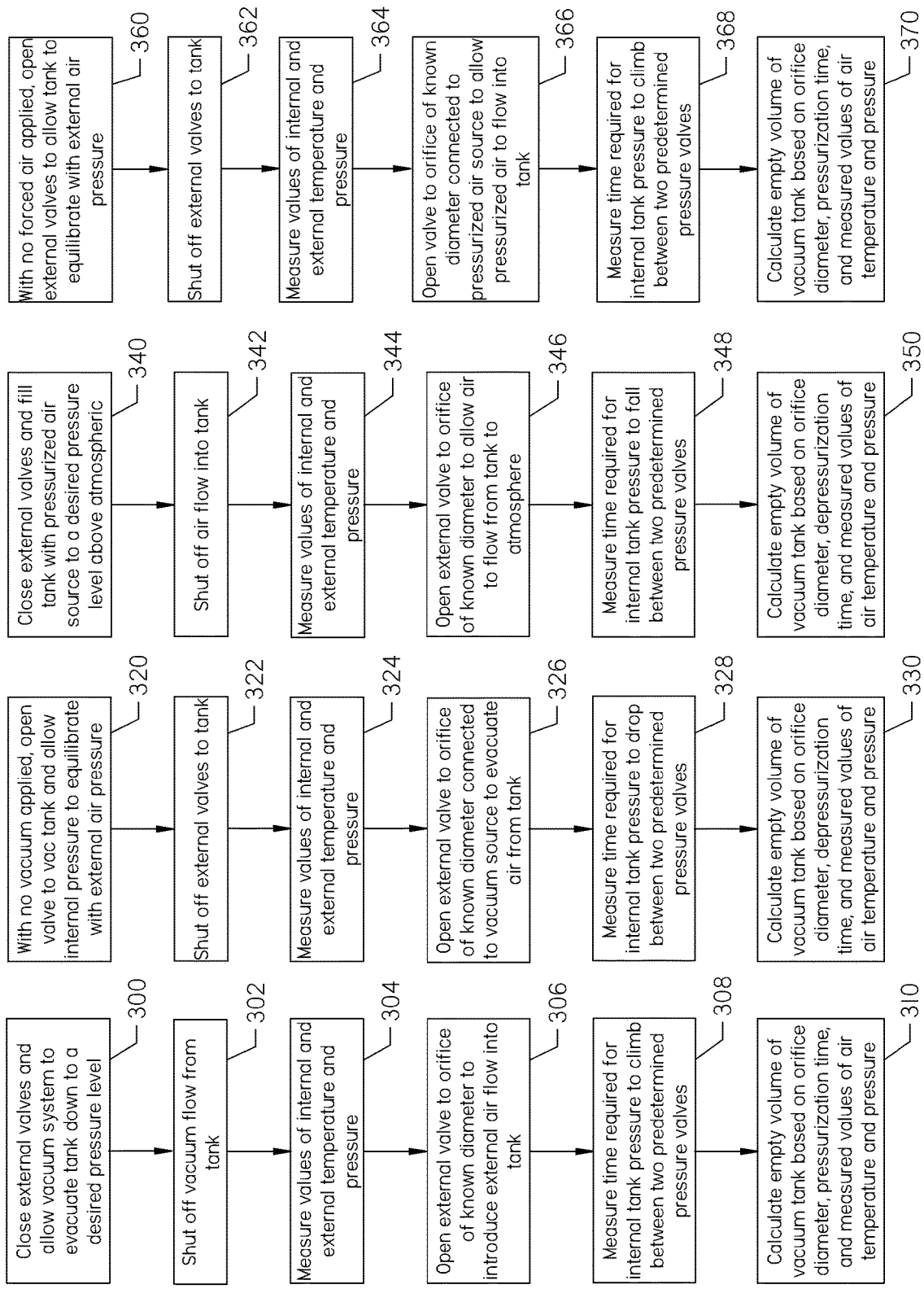
FIG. 11A is a flowchart depicting one method of measuring an amount of open volume within the vacuum tank shown in FIG. 9.
FIG. 11B is a flow chart depicting another method of measuring an amount of open volume within the vacuum tank shown in FIG. 9.
FIG. 11C is a flow chart depicting another method of measuring an amount of open volume within the vacuum tank shown in FIG. 9.
FIG. 11D is a flow chart depicting another method of measuring an amount of open volume within the vacuum tank shown in FIG. 9.

With reference to FIGS. 9 and 11A, in operation, all external valves leading into the tank 102, such as the valve 176, are closed, as shown by step 300 in FIG. 11A. The valve 190 leading to the blower 108 is left open and the blower 108 is actuated. The valves 176 and 190 may be opened or closed in response to a command from the controller. Likewise, the blower 108 may be activated in response to a command from the controller. The blower 108 operates until it has pulled the air pressure within the tank 102 down to a desired level below atmospheric pressure, as shown by step 300. For example, the blower 108 may run until 15 in Hg vacuum (7.4 psi absolute) is reached, but any desired value below atmospheric pressure may be used. Once the internal pressure in the tank 102 reaches the desired value, the valve 190 is closed, isolating the interior of the tank 102 at the desired pressure, as shown by step 302. The controller may be configured to automatically close the valve 190 once the desired internal pressure is reached.

Following isolation of the interior of the tank 102 at the desired pressure, the external and internal pressure sensors 178 and 180 are read and the values recorded, as shown by step 304. An electronic data recording device or controller is preferably used to read the sensors 178 and 180 and record the values. Alternatively, the reading of the sensors 178 and 180 and recording of the values may be done manually. The recorded values are transmitted to the processor and used to calculate the density of the air inside and outside of the tank 102 from known gas laws. As discussed below, such calculated values are subsequently used to find the open volume 166 of the tank 102.

Following recording of the values measured by the sensors 178 and 180, the valve 176 on the pipe section 172 is opened, as shown by step 306. The controller may be configured to automatically open the valve 176 once the values are recorded. Once the valve 176 is opened, external air is sucked into the interior of the tank 102 through the pipe section 172, as shown by step 306. As air is pulled into the tank 102, the pressure within the tank 102 will gradually rise.

Figure 10:
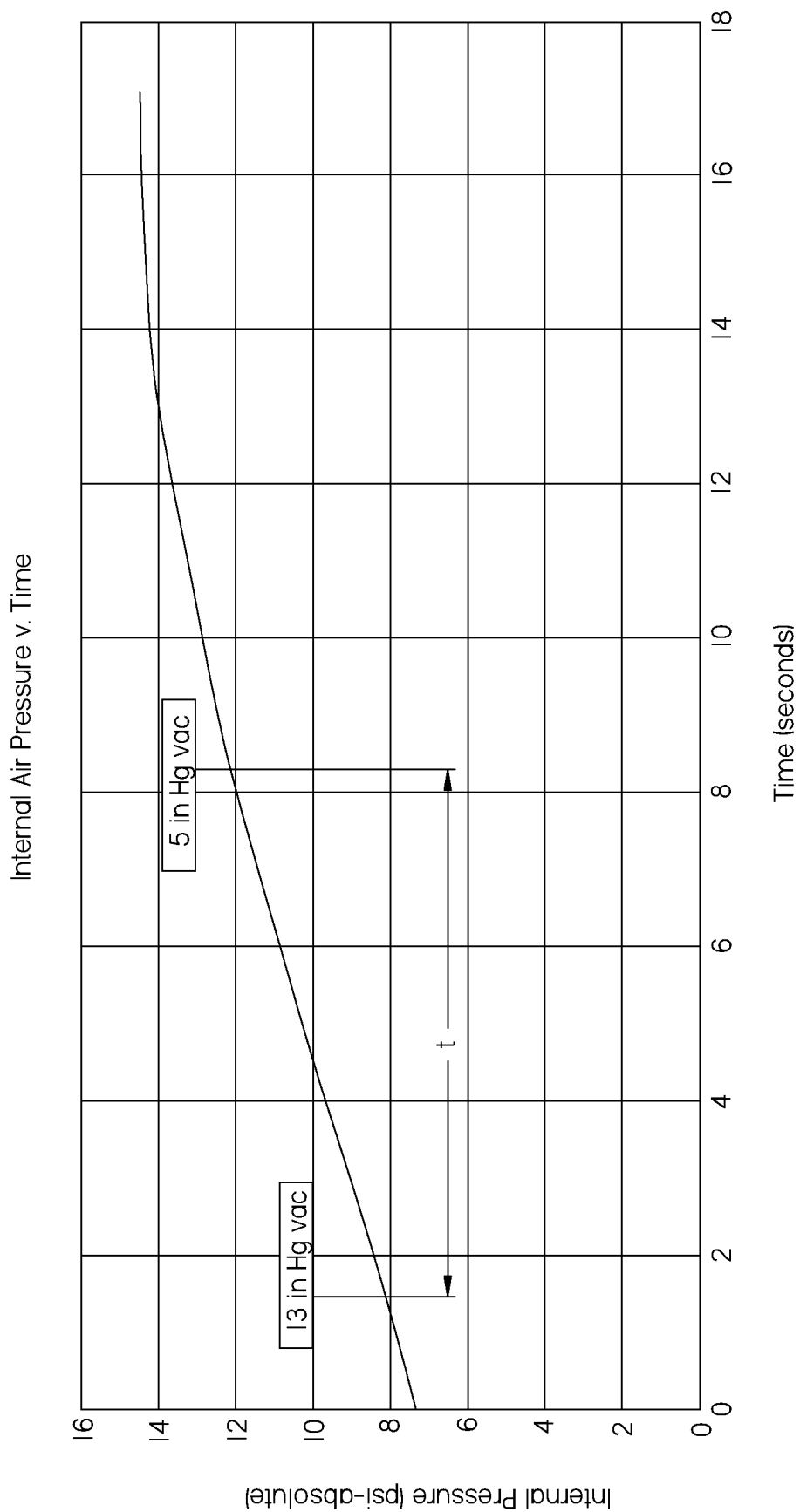
FIG. 10 is a graph depicting the time it takes for the internal pressure within the tank to rise between two predetermined pressure values.

Measurements taken by the internal pressure sensors 178 are continually read and recorded as the pressure rises. Simultaneously, a constant record of the passing time is measured, read, and recorded such that a plot of internal air pressure vs. time is constructed by the processor, as shown in FIG. 10. External air enters the interior of the tank 102 until the air pressure within tank 102 reaches a desired value. For example, external air may enter the tank 102 until the air pressure within the tank 102 rises to 5 in Hg vacuum (12.24 psi absolute).

Continuing with FIGS. 10 and 11A, the plot is used to determine the amount of time it takes the air pressure within the tank 102 to rise from one predetermined value to another, as shown by step 308. For example, the predetermined values may be 13 in Hg vacuum (8.31 psi absolute) and 5 in Hg vacuum (12.24 psi absolute). For any given air density and orifice diameter, d, the time required for the pressure within the tank 102 to rise from one predetermined value to another predetermined value ("the pressurization time value") is a function of the open volume 166 within the tank 102.

Turning back to FIG. 9, the pipe section 172 is preferably short so that any flow loss as air passes through the pipe section 172 is minimal and can be ignored when calculating the open volume of the tank 102. It is also important to keep the differential pressure between the internal and external pressures low enough so that air flow is not in the choked flow range. If the flow loss through the pipe section 172 remains minimal, the velocity of the air entering the tank 102 can be calculated using known relations for compressible fluid flow and may be determined as follows:

$$\frac{V^2}{2} = \frac{p_1}{\rho_1}\frac{k}{k-1}\left[1 - \left(\frac{p_2}{p_1}\right)^{(k-1)/k}\right]$$

Where, V=the velocity of the fluid entering the tank
$P_1$=the external air pressure
$P_2$=the internal air pressure
K=the heat capacity ratio of air (1.4)
$\rho_i$=the density of the external air The mass flow rate, dm/dt, of the gas entering the tank at any instant is equal to:

$$\frac{dm}{dt} = A_i \rho_i V$$

Where, $A_i$=cross sectional area of the orifice
$\rho_i$=the internal density of the air at any point
V=the velocity of the fluid entering the tank A general relationship between the pressurization time value and the open volume 166 of the interior of the tank 102 can be determined. Such relationship can be determined by the calculation of known scientific formulas, repeated empirical testing, or a combination of the two. Once the relationship is determined, the open volume 166 within the tank 102 can be easily determined based on the measured pressurization time value.

Using the above equations, the open volume 166 within the interior of the tank 102 can be calculated by the processor using the orifice diameter, d, of the pipe section 172, the pressurization time value, and the values measured by the external and internal pressures sensors 178 and 180, as shown by step 310 in FIG. 11A.

In an alternative embodiment, the time it takes the pressure to rise from one predetermined value to another could be determined without creating a plot or continuous readout of the time and pressure. In such embodiment, two preset pressure switches could be connected to the interior of the tank 102 to trigger the start and stop of a timer. For example, one pressure switch could be set to close when the vacuum pressure within the tank 102 rises above 13 Hg vacuum, and the second pressure switch could be set to open when vacuum pressure rises above 5 in Hg vacuum. Following opening of the valve 176 installed in the pipe section 172, the timer could be set to start when the first switch closes and stop when the second switch opens. The pressurization time value is obtained from the timer and transmitted to the processor.

Turning to FIGS. 11B-11D, other analogous methods may also be used to find the open volume 166 within the interior of the tank 102. With reference to FIG. 11B, in another embodiment of the method, the method is initiated by opening the valve 176, or other valve connected to atmospheric air, and allowing the internal air pressure to equilibrate with external air pressure, as shown by step 320. The blower 108 remains off during step 320. Following the pressures reaching equilibrium, all external valves leading to the tank 102 are closed, as shown by step 322. The values measured by the external and internal pressure sensors 178 and 180 are then read and recorded, as shown by step 324.

Once the pressure values are recorded, the blower 108 is activated and a valve (not shown) is opened to allow the blower 108 to pull air out of the tank 102 through an orifice of known diameter, as shown by step 326. In contrast to the method in FIG. 11A, the time measurement of interest is the time it takes for the air pressure to drop between two preselected values ("depressurization time value") as air is extracted from the tank 102, as shown by step 328. The open volume 166 within the tank 102 is then calculated based on the orifice diameter, d, the depressurization time value, and the values measured by the internal and external sensors 178 and 180 as shown by step 330. A relationship between the open volume 166 of the tank 102 and depressurization time value could be determined for use in subsequent operations.

With reference to FIGS. 11C and 11D, the disclosed methods may be used with those evacuation systems that can pressure up the interior of the tank 102. Pressurizing up the interior of the tank 102 provides the ability to unload the contents of the tank 102 under pressure, rather than simply dumping the contents from the tank 102. This feature of some evacuation systems may be referred to as a "pressure off" feature. Such feature allows alternative methods of finding the open volume 166 within the tank 102.

Continuing with FIG. 11C, the disclosed method comprises closing all external valves leading to the tank 102. The blower 108 is then used to fill the tank 102 with pressurized air until the internal air pressure reaches a desired value above atmospheric pressure, as shown by step 340. Once the desired air pressure is reached, air flow into the tank 102 is shut off, as shown by step 342. The values measured by the external and internal pressure sensors 178 and 180 are then read and recorded, as shown by step 344.

Once the pressure values are recorded, the valve 176 on the pipe section 172 is opened and air is allowed to escape from the tank 102 through the pipe section 172, as shown by step 346. The time it takes for the air pressure to drop between two preselected values as air is extracted from the tank 102 is measured and recorded, as shown by step 348. The open volume 166 within the tank 102 is then calculated based on the orifice diameter, d, the depressurization time value, and the values measured by the internal and external sensors 178 and 180, as shown by step 350. A relationship between the open volume 166 of the tank 102 and depressurization time value could be determined for use in subsequent operations.

With reference to FIG. 11D, the disclosed method is analogous to the method of FIG. 11B, but in reverse. The method comprises opening all external valves to allow the internal air pressure within the tank 102 to equilibrate with the external air pressure, as shown by step 360. No air is being forced into the tank 102 during step 360. Following the pressures reaching equilibrium, all external valves leading to the tank 102 are closed, as shown by step 362. The values measured by the external and internal pressure sensors 178 and 180 are then read and recorded, as shown by step 364.

Once the pressure values are recorded and all external valves are closed, the blower 108 is activated and air is ported from the blower 108 such that it supplies air to the tank 102, and a valve (not shown) is opened to a line leading from the blower 108 to the tank 102, the line having an orifice of a known diameter, as shown by step 366. Pressurized air is then forced into the tank 102. The amount of time it takes the internal air pressure to climb to a predetermined pressure value is measured and recorded, as shown by step 368. The open volume 166 within the tank 102 is then calculated based on the orifice diameter, d, the pressurization time value, and the values measured by the internal and external sensors 178 and 180, as shown by step 370. A relationship between the open volume 166 of the tank 102 and the pressurization time value could be determined for use in subsequent operations.

Figure 12:
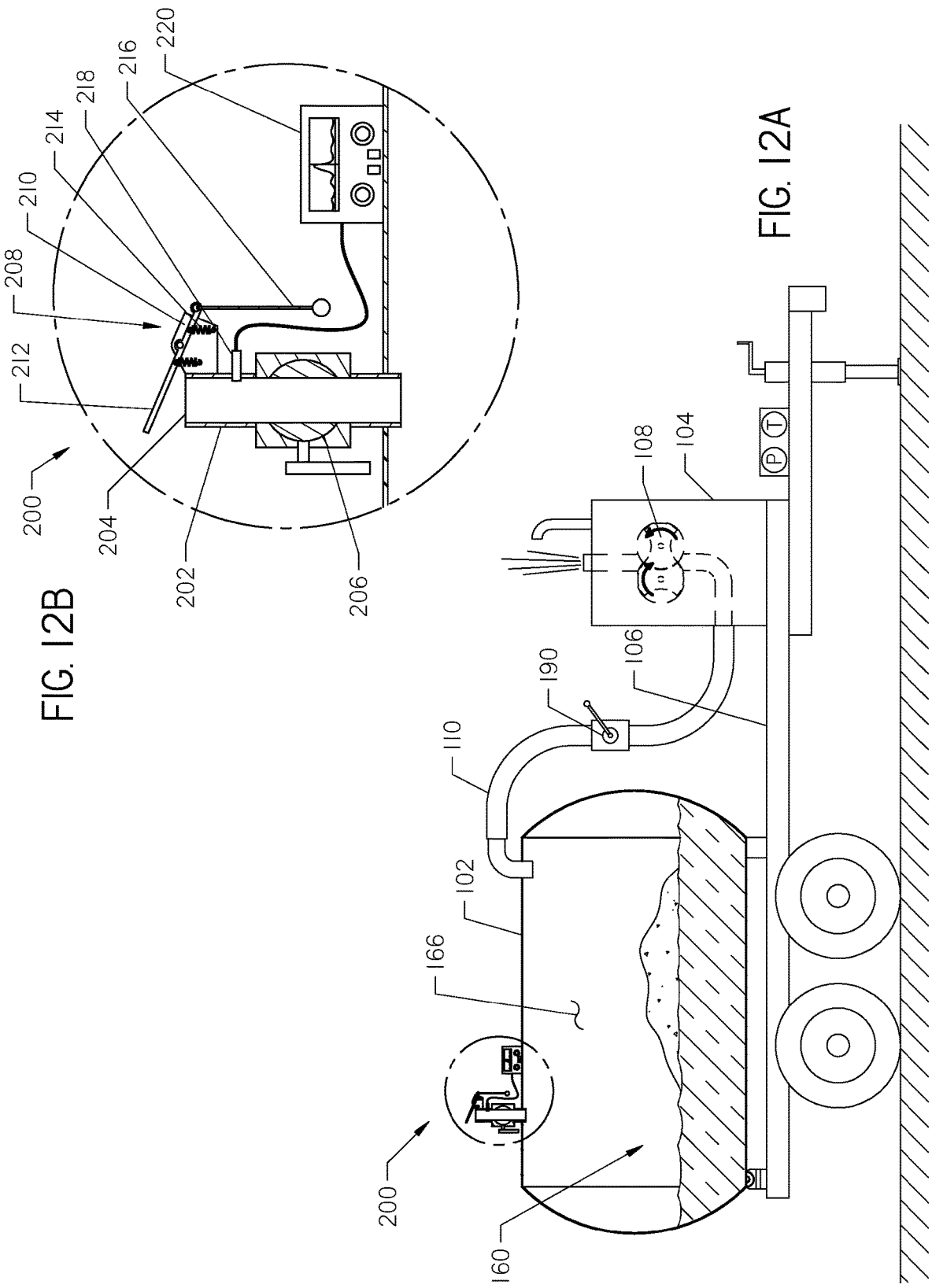
FIG. 12A is the side elevational view of the mobile vacuum evacuation unit shown in FIG. 8, with another embodiment of a system for measuring an amount of open volume within the tank incorporated into the unit.
FIG. 12B is an enlarged view of area A shown in FIG. 12A.

Turning to FIGS. 12A and 12B, another method of estimating the open volume 166 within the tank 102 is illustrated. The method utilizes a resonance-based volumetric measurement system 200. The system 200 comprises a standpipe 202 installed on the top of the tank 102 such that it penetrates the walls of the tank 102. The interface between the standpipe 202 and the walls of the tank 102 is made airtight by welding or sealing agents such that no air may escape around the perimeter of the standpipe 202. The standpipe 202 has an open end 204 exposed to the external ambient air. The standpipe 202 is fitted with a valve 206 along its length. The valve 206 may be a ball valve, for example. The valve 206 selectively isolates the interior of the tank 102 from the external air.

The principle behind using a volumetric measurement system 200 to measure the open volume 166 is that the tank 102 and standpipe 202 together can act as a Helmholz resonator. A common example of a Helmholz resonator is an empty glass bottle. When air is blown across the mouth of the bottle, a tone is produced. The air inside the neck of the bottle acts as a mass and the air inside the body of the bottle acts as a spring. When air is blown across the mouth of the bottle, the mass of air within the neck springs against the air inside of the body. Such action causes the air within the neck of the bottle to become excited and vibrate, creating the tone.

The frequency of the resonance in a Helmholz resonator is a function of the volume inside of the body of the bottle and the effective mass of air in the neck of the bottle. In the present case, the frequency of the resonance is a function of the volume of air inside of the tank 102 and the effective mass of air in the standpipe 202. The mass of air within the standpipe 202 is dictated by the inner diameter of the standpipe, $d_p$, the length of the pipe $L_p$, and the density of the air.

The natural frequency of the resonant motion of the air within the standpipe 202 may be determined by the following formula:

$$\omega = c\sqrt{\frac{A}{L'V}}$$

Where:
$\omega$=the natural frequency of the air oscillation in Hz
c=the speed of sound in air at the given temperature A=the cross-sectional area of the standpipe (=π (d$_p$)$^2$/4)
L'=the effective length of the standpipe (slightly longer than L$_p$, the exact dimension determined by empirical testing)
V=the volume of the open area 32 in the tank
By rearranging:

$$V = \frac{A}{L'\left(\frac{\omega}{c}\right)^2}$$

Continuing with FIGS. 12A and 12B, in operation, the air mass inside of the standpipe 202 is excited using a flapper valve 208. The flapper valve 208 comprises a bracket 210 attached to the side of the standpipe 202 and supporting a flapper 212. The flapper 212 is positioned such that it is capable of fully covering the open end 204 of the standpipe 202. One or more springs 214 attached to the flapper 212 and the bracket 210 bias the flapper 212 in an open position, as shown in FIG. 12B. An activation cord 216 attached to the flapper 212 is used to manipulate the position of the flapper 212. Pulling down on the cord 216 and releasing it causes the flapper 212 to slap-shut over the standpipe 202 for an instant before returning to its normal open position. The slapping of the flapper 212 on the open end 204 of the standpipe 202 excites the air mass within the standpipe 202.

The acoustic response of the excited air mass within the standpipe 202 is picked up by a microphone 218. The microphone 218 is installed through the side wall of the standpipe 202 such that it communicates with the interior of the standpipe 202. The microphone 218 transmits the tone created within the standpipe 202 by the flapper 212 to a frequency analyzer 220. The frequency analyzer 220 may be supported on the tank 102 or trailer 106 and have a wired connection with the microphone 218, as shown in FIG. 12B. In alternative embodiments, the frequency analyzer 220 may communicate wirelessly with the microphone 218. In some embodiments, the frequency analyzer 220 may be an application included in the display device 600, shown in FIG. 20, that can analyze acoustic frequencies.

In operation, the blower 108 is disconnected from the tank 102, either by shutting down the blower 108 or closing the valve 190. The valve 206 in the standpipe 202 is then opened and the air pressure within the tank 102 is allowed to reach equilibrium with the external air. Once equilibrium of the air is reached, the activation cord is pulled and released, slapping the flapper 212 against the open end 204 of the standpipe 202. The slapping of the flapper 212 excites the air within the standpipe 202, creating a tone. The tone is amplified by the microphone 218 and communicated to the frequency analyzer 220. The frequency analyzer 220 determines the frequency of the tone and communicates the frequency to the processor. The determined frequency is then used by the processor to calculate the open volume 166 of the tank 102, using the equations discussed above.

The activation cord 216 may be configured so that it can be pulled and released without human input. In such case, the activation cord 216 may automatically be pulled and released in response to a command from the controller.

The standpipe 202 shown in the figures is a straight vertical pipe section. In alternative embodiments, the standpipe could be curved or extend horizontally or have any other orientation if it provides a connection to the tank at a position high enough to not be block by material 160 within the tank 102.

In further alternative embodiments, the air within the standpipe 202 may be excited by devices other than flapper valve 208 described herein. For example, a jet of air could be blown across the opening of the standpipe. Alternatively, the opening of the standpipe could simply be struck by a flat object, such as a board or steel plate.

Figure 13:
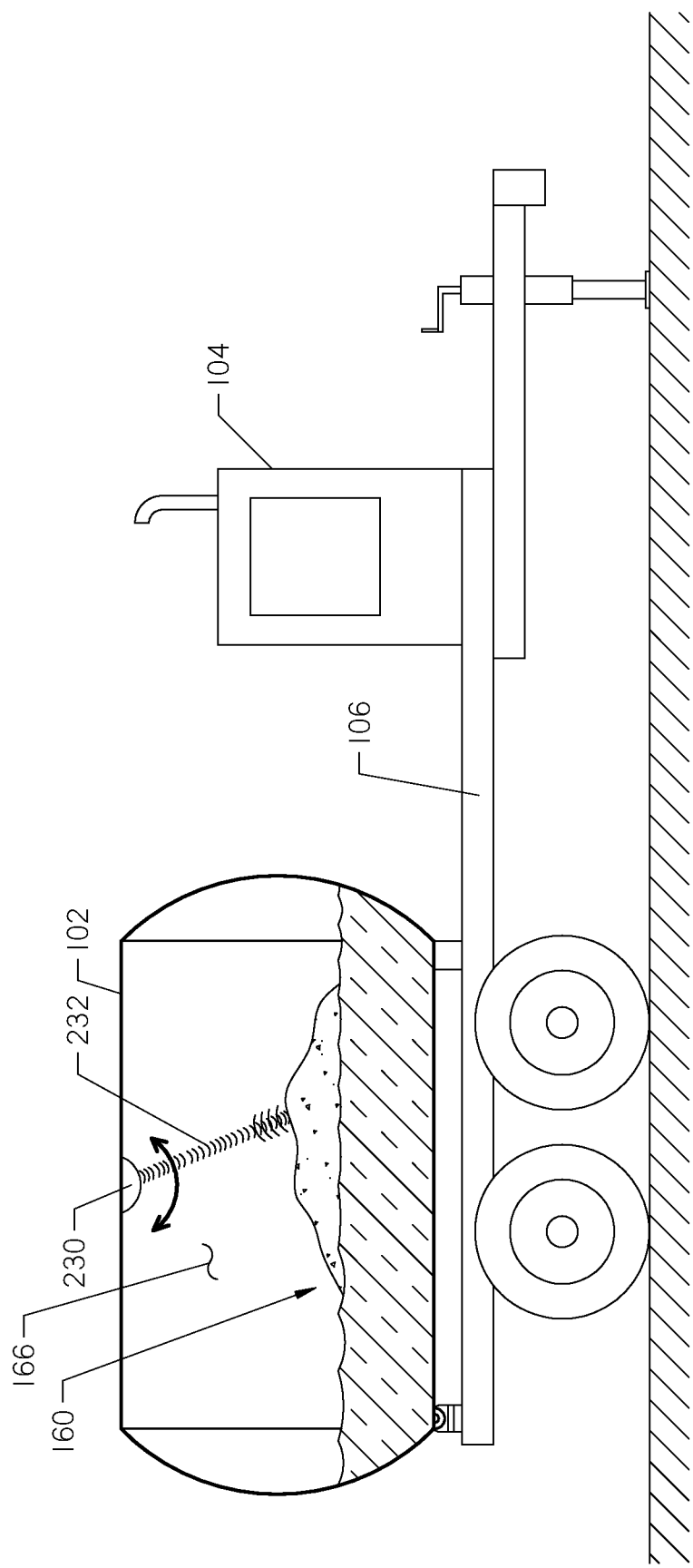
FIG. 13 is the side elevational view of the mobile vacuum evacuation unit shown in FIG. 8, with another embodiment of a system for measuring an amount of open volume within the tank incorporated into the unit.

Turning to FIG. 13, another method of estimating the open volume 166 of the tank 102 is shown. The method utilizes an electronic scanning system 230 installed inside of the tank 102 and attached to an upper surface of the tank 102. In operation, the scanning system 230 transmits an energy source 232 at the surface of the material 160 within the tank 102. The energy source 232 may comprise an optical beam, an ultrasonic beam, an electromagnetic energy transmission, or other energy source known in the art.

The scanning system 230 is configured to measure data created in response to the energy source 232 contacting the surface of the material 160. The measured data is used to estimate the distance between the scanning system 230 and the surface of the material 160. For example, the time of flight of the energy source 232 to travel from the scanning system 230 to the material 160 may be measured. Alternatively, the intensity of the reflection of the energy source 232 off the surface of the material 160 may be measured.

The scanning system 230 may be configured to scan all the surfaces of material 160 within the tank 102, such that the distance between the scanning system 230 and all surfaces of material 160 within the tank 102 is measured. The open volume 166 within the tank 102 can be estimated using all the measured distances between the scanning system 230 and the surface of the material 160. While this method provides an accurate estimate of the open volume 166 within the tank 102, it may be costly to employ. The scanning system 230 would also need to be configured to withstand the harsh conditions within the tank 102.

Any of the above methods may be used to estimate the open volume 166 tank 102. Other methods known in the art and not specifically described herein may also be used. Once the open volume 166 within the tank 102 is determined, the volume of the material 160 can be determined. The volume of the material 160 is simply the difference between the known total volume of the tank 102 minus the open volume 166.

The open volume or the volume of material contained within the tank 102 may be displayed on the display device 600, as shown for example by item 604 in FIG. 20. In operation, the steps required to perform any of the above described methods may be performed automatically in response to human input on the display device 600.

Once the volume of material 160 within the tank 102 is calculated, the moisture content of the material 160 can be calculated.

Calculating the Moisture Content of the Material in the Tank

Most of the material 160 pulled into the tank 102 during most operations is either liquid material 162 or solid material 164. An estimation of the moisture content or the amount of liquid making up the material 160 within the tank 102 can be determined if the material 160 is assumed to compose only water and soil or dry rock components.

To determine the moisture content of the material 160, the density of the material 160 within the tank 102 must first be calculated. The density of the material in the tank 102 equals the weight of the material 160 within the tank 102 divided by the volume of the material 160 within the tank 102.

Once the density of the material 160 is determined, the following method can be used to calculate the moisture content of the material 160. As shown below, the moisture content of the material 160 can be expressed by weight or by volume.

The total volume of the material in the tank is:

$$V_{t,s+w} = V_{solids} + V_{water}$$

$V_{t,\,s+w}$=the total volume of slurry in the tank
$V_{solids}$=the volume of the solids portion of the material in the tank
$V_{water}$=the volume of the water in the tank For rock or soil solids, a good estimate of the specific gravity of those particles is 2.65. Thus:

$$\rho_{solids} = 2.65\, \rho_{water}$$

$\rho_{solids}$=the density of the solid particles in the slurry (assumed to be soil or rock)
$\rho_{water}$=the density of water The total weight of the material in the tank is the sum of the weight of the solid and water components.

$$W_{total} = W_{solids} + W_{water}$$

The above equation can be re-written as:

$$W_{total} = \rho_{solids} V_{solids} + \rho_{water} V_{water}$$

A relationship can be developed for the volume of the water in the tank given as:

$$V_{water} = \frac{(2.65\, \rho_{water}\, V_{t,s+w} - W_{total})}{(1.65\, \rho_{water})}$$

The weight of the water is then simply:

$$W_{water} = V_{water} \times \rho_{water}$$

Using the calculated weight of the liquid material 162 within the tank 102, the moisture content of the material 160 can be expressed as a percentage of the total weight of the material 160, as follows:

$$\% \text{ Water} = 100 \times W_{water}/W_{total}$$

Using the above equations, the moisture content of the material 160 within the tank 102 can be calculated using the previously calculated total weight of the material 160 within the tank 102 and the previously calculated volume of the material 160 within the tank 102. The calculated moisture content may be displayed on the display device 600, as shown for example by item 606 in FIG. 20.

Once the weight of the liquid material 162 within the tank 102 is determined, the amount of drying agent needed to convert the material 160 into a solidified batch of material can be calculated.

Calculating the Amount of Drying Agent to be Added to the Tank

Drying agents typically comprise bulk material fillers, such as sawdust, high moisture absorbing clays, such as bentonite, and/or superabsorbent polymers, such as sodium polyacrylate or potassium polyacrylate. Using drying agents adds to the total cost of the operation and adds to the total volume of material 160 to be dumped. Thus, it is desirable to use the smallest amount of drying agent possible that will produce a solid material. By estimating the moisture content of the material 160 within the tank 102, the smallest amount of drying agent needed can be estimated.

The term "solid" when used herein with reference to converting the liquid material into a "solid", refers to any consistency of material that is thick enough not to disperse a wide range when dumped from the tank 102. The material is considered a "solid" if it is thick enough so that it is "stackable" within a single area. For example, the liquid material, when converted to a solid may have the consistency of a thick paste or dense mud. When the liquid material 162, the solid material 164, and the drying agent are mixed, a solidified batch of material is created.

The amount of drying agent needed to convert the liquid material 162 within the tank 102 into a solid "stackable" material is typically based on the amount of liquid material 162 within the tank 102. The below equation can be used to estimate the smallest amount of drying agent needed.

$$\text{Weight of drying agent needed} = W_{water} \times R_{DA}$$

$R_{DA}$=the recommended drying agent by weight per unit weight of water

The calculated amount of drying agent needed may be displayed on the display device 600, as shown for example as item 608 in FIG. 20. Once the estimated amount of drying agent needed is calculated, the calculated amount of drying agent may be added to the tank 102.

Adding the Drying Agent to the Tank

One method of adding the drying agent to the tank 102 is to simply dump the drying agent into the tank 102 through a top hatch, such as the hatch 170, shown in FIG. 1. The drying agent can be dumped into the tank 102 after the blower 108 is shut down or isolated from the tank 102 and the air pressure within the tank 102 has been allowed to reach atmospheric pressure.

Figure 14:
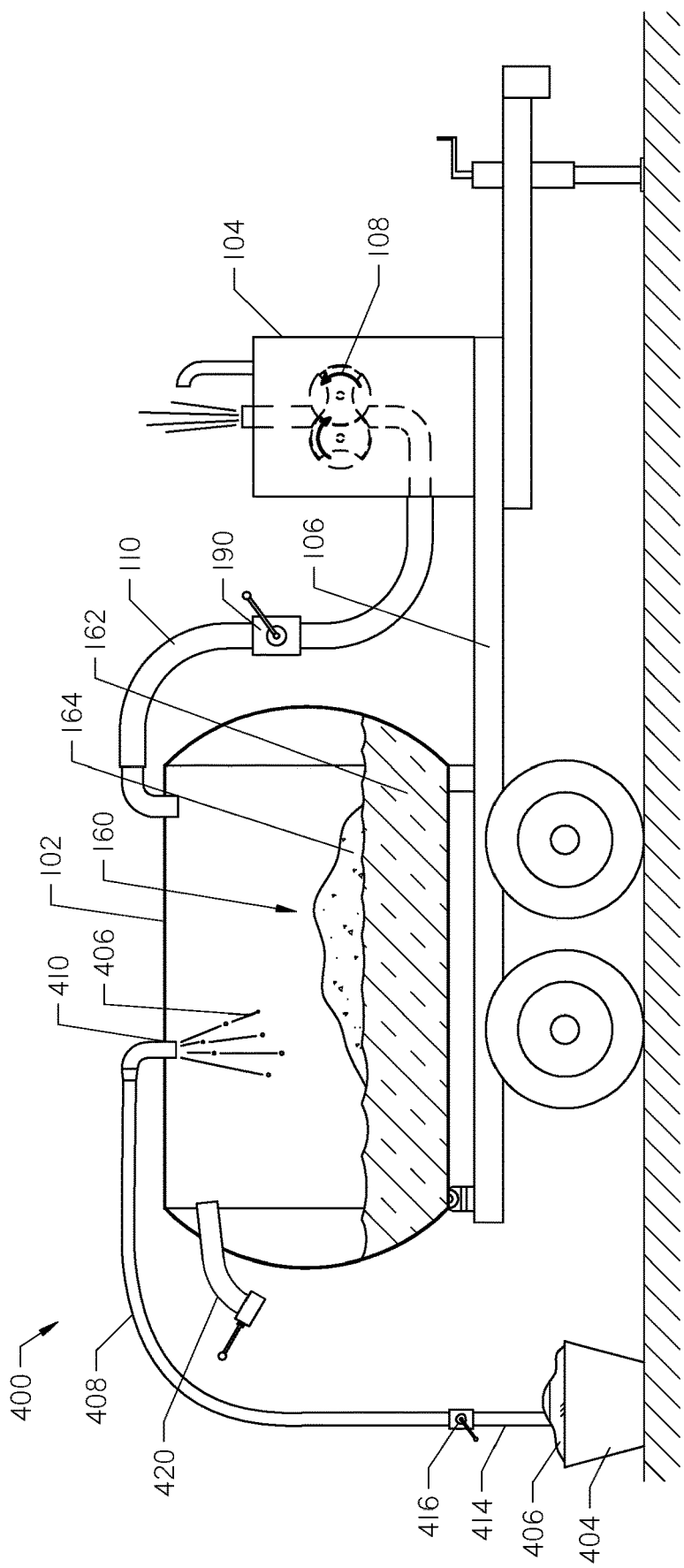
FIG. 14 is the side elevational view of the mobile vacuum evacuation unit shown in FIG. 8, with a system for delivering drying agent to the interior of the tank incorporated into the unit.
Figure 15:
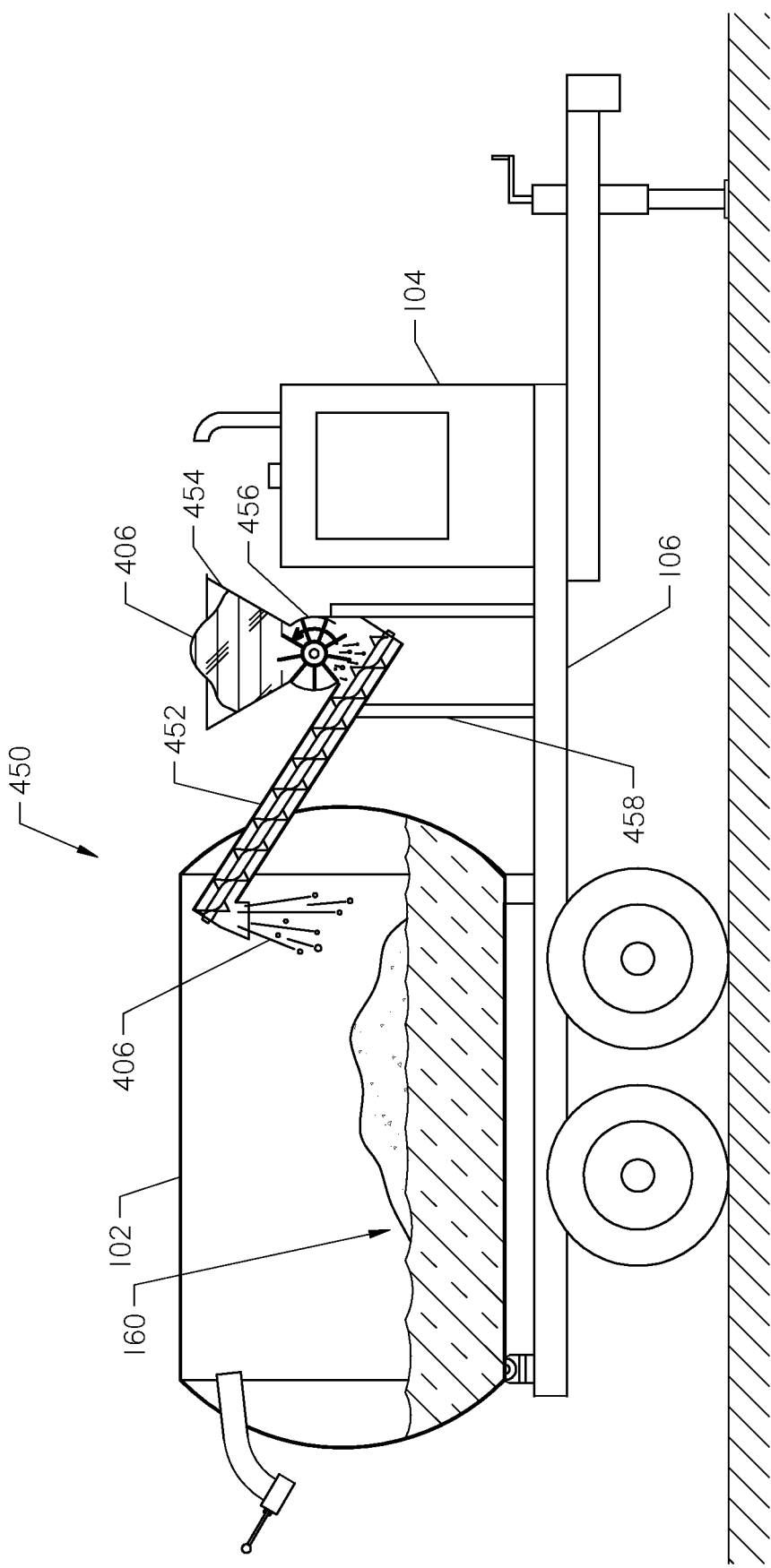
FIG. 15 is the side elevational view of the mobile vacuum evacuation unit shown in FIG. 8, with another system for delivering drying agent to the interior of the tank incorporated into the unit.
Figure 16:
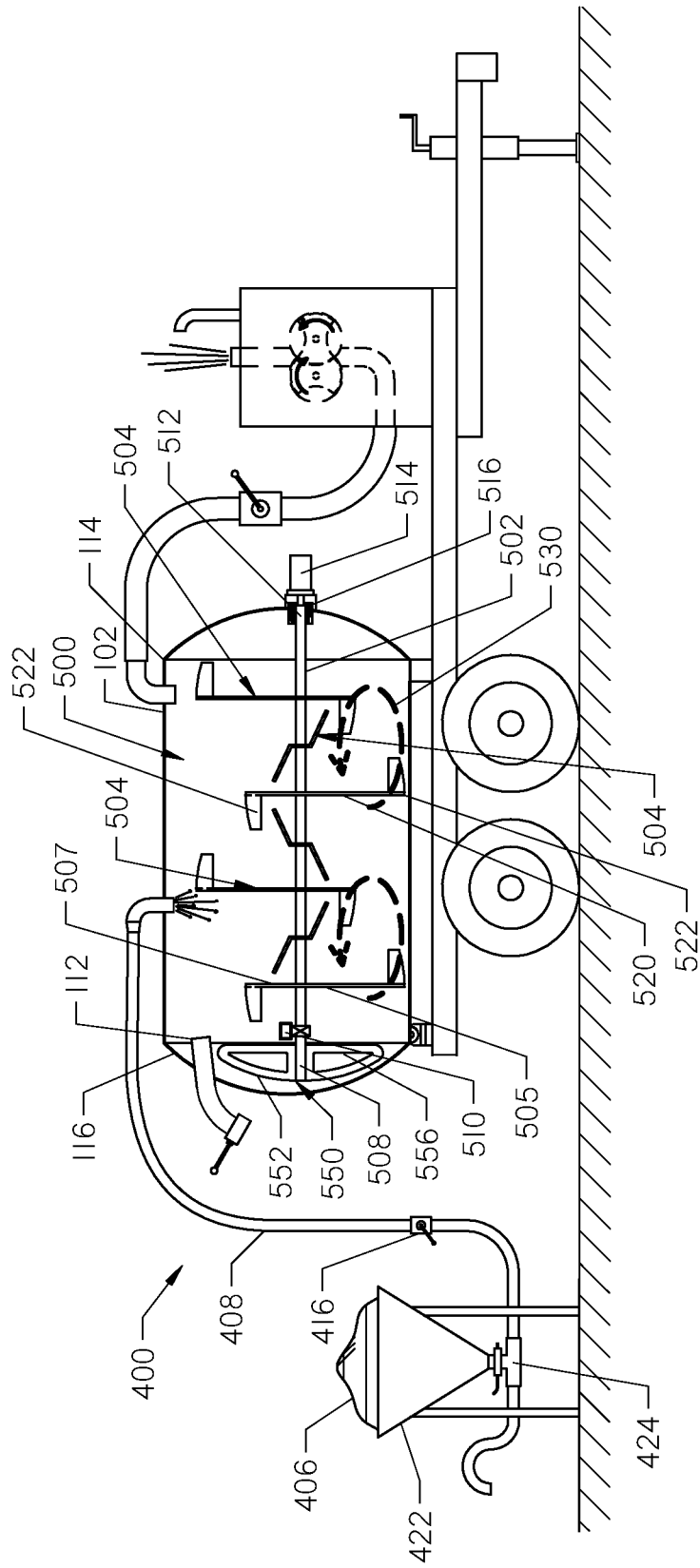
FIG. 16 is the side elevational view of the mobile vacuum evacuation unit shown in FIG. 8, with another system for delivering drying agent to the interior of the tank and a system for mixing the drying agent and material within the tank incorporated into the unit. The material within the tank has been removed for clarity.

With reference to FIGS. 14-16, methods of adding the drying agent to the tank using delivery systems 400 or 450 are illustrated. The delivery system 400 shown in FIG. 14 utilizes a container 404 housing the drying agent 406 and a hose or other pipe section 408. The container 404 is filled with the calculated amount of drying agent 406 and is positioned adjacent an external surface of the tank 102. One end of the hose 408 is installed within a port 410 formed in the tank 102. The port 410 is preferably formed on the top of the tank 102, as shown in FIG. 14. The hose 408 extends from the tank 102 and an open end of the hose 408 is placed near or within the container 404. The hose 408 may also be attached to a suction tube 414 and the suction tube 414 may be placed near or within the container 404, as shown in FIG. 14. A valve 416 is installed within the hose 408 or suction tube 414 to isolate the interior of the tank 102 from the container 404, if needed.

In operation, once the hose 408 or suction tube 414 is in communication with the drying agent 406, the blower 108 is actuated. The blower 108 creates a vacuum within the tank 102 causing the hose 408 to suck the drying agent 406 into the tank 102. Once all the drying agent 406 is transferred from the container 404 to the tank 102, the blower 108 may be shut down.

In alternative embodiments, the hose 408 may be attached to an inlet port 420 used during excavation operations to draw material 160 into the tank 102. However, using the same port to draw the material 160 and the drying agent 406 into the tank 102 may result in the build-up of residue within the inlet port 420. Thus, it is preferred to use a different port, such as the port 410 shown in FIG. 14, to deliver the drying agent 406 into the tank 102.

While the container 404 is shown positioned on the ground surface 127 in FIG. 14, in alternative embodiments the container 404 may be supported on the trailer 106. The drying agent 406 may be pulled from the top of the container 404 or may be pulled from a side or bottom of the container 404. In further alternative embodiments, a hopper 422 may be used in place of the container 404, as shown in FIG. 16. An inlet conduit 424 may transfer drying agent 406 between the hopper 422 and the hose 408, as shown in FIG. 16. The hopper 422 may be configured to only release the calculated amount of drying agent 406.

With reference to FIG. 15, the delivery system 450 utilizes a conveyor 452 in communication with a hopper 454. The conveyor 452 is installed at least partially within the interior of the tank 102. The conveyor 452 may be a screw conveyor or auger, belt conveyor, or drag conveyor, for example. The conveyor 452 may be installed into the tank 102 through a port or hatch formed in the side or top of the tank 102. An end of the conveyor 452 positioned external to the tank 102 is situated below the hopper 454. A rotating air lock 456 is positioned at a bottom end of the hopper 454 and operates to separate the hopper 454 from the internal suction of the vacuum tank 102. The hopper 454 and conveyor 452 may be supported on the trailer 106 using a support structure 458, as shown for example in FIG. 15.

In operation, the calculated amount of drying agent 406 is added to the hopper 454. Alternatively, the hopper 454 may be configured to only release the calculated amount of drying agent 406. The drying agent 406 passes through the rotating air lock 456 and onto the rotating conveyor 452. The rotating conveyor 452 delivers the drying agent 406 into the interior to the tank 102, as shown in FIG. 15. Once all the drying agent 406 is transferred from the hopper 454 to the tank 102, in one embodiment, the conveyor 452 may be shut down and removed from the interior of the tank 102.

While the present disclosure focuses on adding a drying agent to the interior of the tank 102, in operation, other substances may need to be combined with the material 160 in the tank 102. For example, it may be desired to add one or more of the following substances to the material 160: pH modifying agents, cementing agents, fertilizer, flocculating materials, precipitating agents to pull minerals out of the material 160, coloring agents, viscosity modifying materials, which are used to keep suspended particles from settling to the bottom of the tank 102 during transport, or other desired substances known in the art. The delivery systems 400 or 450 may be used to deliver such substances to the interior of the tank 102.

The various features described herein and used with the delivery systems 400 and 450 may be activated or deactivated in response to human input on the display device 600, as shown for example by a button 610 in FIG. 20.

Other methods known in the art may also be used to add the calculated amount of drying agent into the interior of the tank 102. Once the drying agent is added to the tank 102, the mixing of the drying agent 406 with the material 160 may begin.

Mixing the Drying Agent with the Material in the Tank

With reference to FIG. 16, a mixing system 500 configured to mix the drying agent 406 and material 160 within the tank 102 is shown. The material 160 and drying agent 406 are not shown within the tank 102 to better view the mixing system 500. The mixing system 500 may also be used to mix other substances added to the tank 102 into the material 160.

The system 500 comprises a shaft 502 installed within the interior of the tank 102 and supporting a plurality of paddle assemblies 504. In operation, rotation of the shaft 502 rotates the paddle assemblies 504. The rotating paddle assemblies 504 mix the drying agent 406 and material 160 within the interior of the tank 102.

Figure 17:
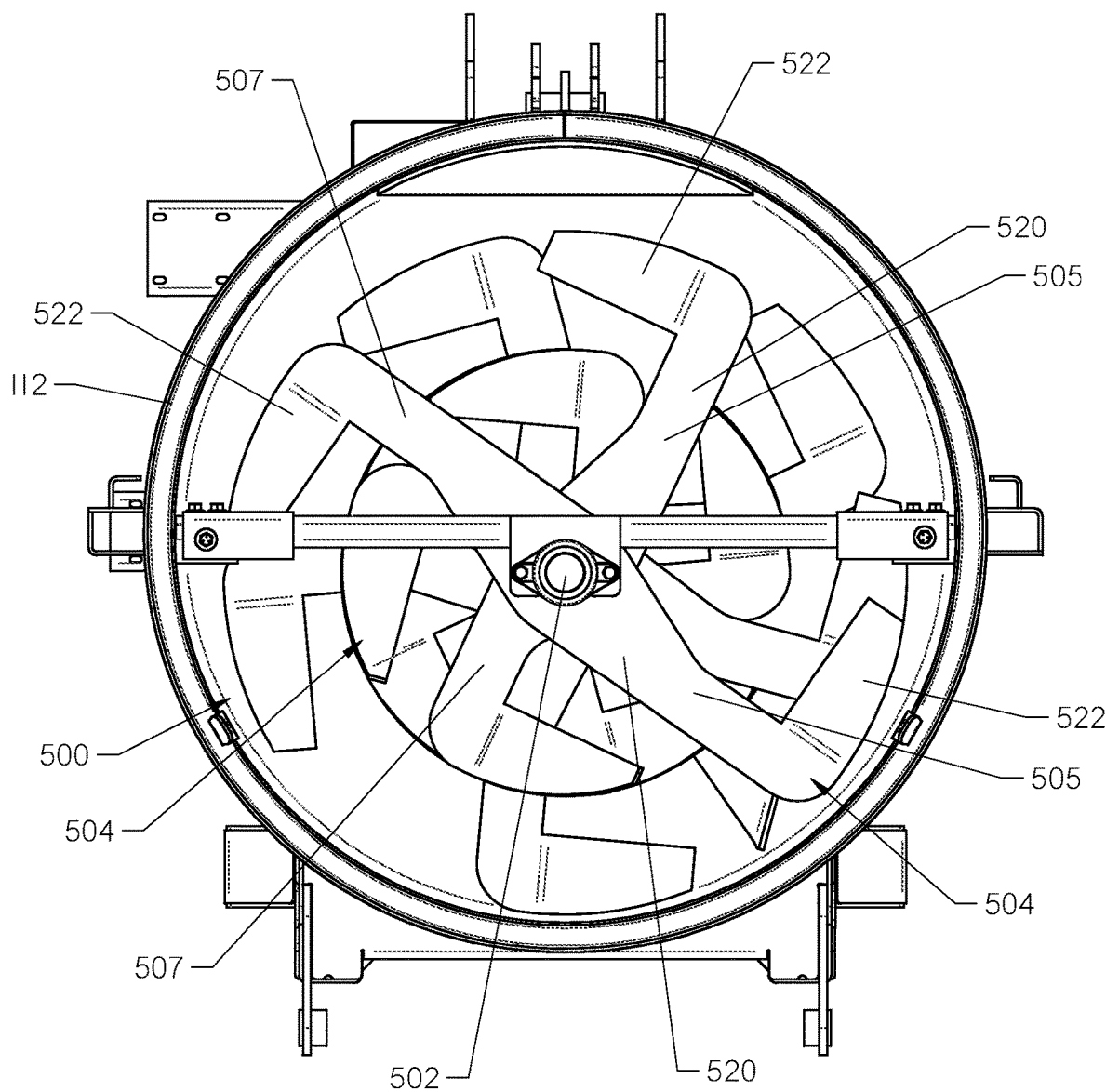
FIG. 17 is a front elevational view of the vacuum tank and mixing system shown in FIG. 16. The door of the tank and a portion of the mixing system has been removed for clarity.
Figure 18:
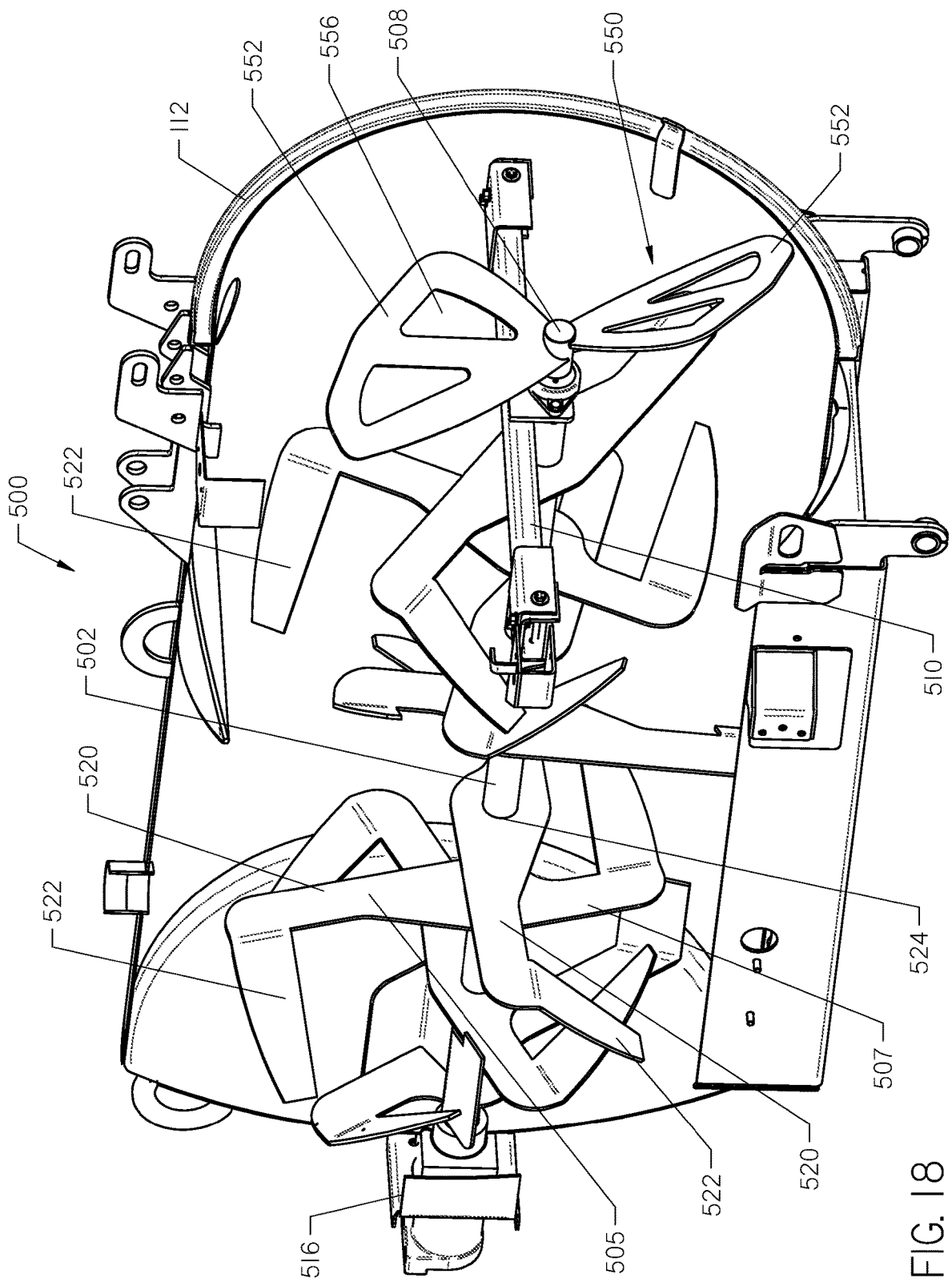
FIG. 18 is a front perspective view of the vacuum tank and mixing system shown in FIG. 16.

Continuing with FIGS. 16-18, the shaft 502 extends along the length of the tank 102 and is supported at the opposed ends 112 and 114 of the tank 102. A first end 508 of the shaft 502 is supported on a cross-bar 510 installed within the interior of the tank 102 adjacent the door 116. The cross-bar 510 extends along the diameter of the tank 102 and is attached to opposed sides of the tank 102.

An opposed second end 512 of the shaft 502 extends to or through the closed end 114 of the tank 102 and is operatively connected to a motor 514 supported on an external surface of the tank 102. The motor 514 is preferably supported on an opposite end of the tank 102 from the door 116 and may be a hydraulic or electric motor. In operation, the motor 514 drives rotation of the shaft 502 and paddle assemblies 504. The shaft 502 may rotate about a bearing assembly 516 engaged with the motor 514. The bearing assembly 516 may be supported in the interior of the tank 102, as shown in FIG. 16. One or more seals may be located between the bearing assembly 516 and the motor 514 to prevent material or pressurized air from leaking from the tank 102.

Each paddle assembly 506 comprises an elongate arm 520 supporting a pair of paddle elements 522. The arm 520 is rigidly supported on the shaft 102 such that it has a first extending section 505 and a second extending section 507. The first section 505 has a greater length than the second section 507 such that the arm is positioned off-center on the shaft 502.

The arms 520 are attached to the shaft 502 such that they are in a spaced-relationship along the length of the shaft 502. Adjacent arms 520 are rotated at various non-zero angles relative to one another so that the first and second sections 505 and 507 of each arm alternate throughout the length of the tank 102. For example, adjacent arms 520 may be rotated anywhere between 30 and 90 degrees relative to one another. In operation, the first section 505 of each arm circumscribes a path near the bottom of the tank 102, while the second sections 507 circumscribe a path closer to the center of the tank 102, as shown in FIG. 16. The first sections 505 of the arms 520 are sized to not interfere with any components formed on or attached to the interior of the tank 102.

Each arm 520 is rigidly attached to the shaft at an attachment point 524, as shown in FIG. 18. The attachment point 524 may comprise a hole configured to receive the shaft 502. In alternative embodiments, the arm 520 may be two pieces configured to join around the shaft at an attachment point formed in each piece of the arm. The arm 520 may be rigidly secured to the shaft 502 at the attachment point 524 using screws, pins, threads, clamps, or other means known in the art. While the arms 520 are rigidly secured to the shaft 502, they are preferably configured to be removed and re-attached to the shaft 502, as needed.

Continuing with FIGS. 16-18, the paddle elements 522 are attached to opposite sides of the arm 520 adjacent the opposed ends of the arm 520. Each paddle element 522 extends from the arm 520 at approximately a right angle and has a length that is equal to about one-third the length of the arm 520. The paddle elements 522 may also be canted relative to the arm 520 so that they urge the material 160 to move longitudinally within the tank 102. The paddle elements 522 may be canted in different directions.

By canting the paddle elements 522 in different directions, the paddle elements 522 urge the drying agent 406 and the material 160 within the tank 102 in opposite directions longitudinally as the mixing assembly 500 rotates. For example, the paddle elements 522 attached to the first section 505 of each arm 520 may urge the drying agent 406 and the material 160 towards the front end 112 of the tank 102. In contrast, the paddle elements 522 attached to the second section 507 of each arm 520 may urge the drying agent 406 and the material 160 towards the rear end 114 of the tank 102. Such arrangement causes the material 160 and drying agent 406 to churn together within the tank 102, as shown by arrows 530 in FIG. 16. The churning motion helps effectively blend the drying agent 406 and material 160 together during operation.

The paddle elements 522 may be separate pieces attached to the arm 520 by welding, pins, fasteners, or other mechanical means known the art. Alternatively, the paddle elements 522 may be formed integral with the arm 520. For example, the paddle elements 522 may be formed on the arm by bending opposed ends of the arm 520. Each paddle assembly 504 is preferably made of steel or other metal.

Continuing with FIGS. 16 and 18, the mixing system 500 further comprises a modified paddle assembly 550 attached to the first end 508 of the shaft 502. The paddle assembly 550 preferably comprises a plurality of butterfly wing-shaped paddles 552. An end of each paddle 552 is attached to the first end 508 of the shaft 502 and each paddle 552 extends therefrom towards the sides of the tank 102. The paddles 552 may be positioned so that each extends at a non-zero angle relative to a longitudinal axis of the shaft 502. The outer edges of the paddles 552 are shaped to correspond to the dome-shaped inner surface of the door 116 of the tank 102 so that the paddles 552 can contact any drying agent 406 or material 160 caught around the door 116. One or more cut-outs 556 may be formed in each of the paddles 552, if desired.

The mixing system 500 may be installed within the tank 102 prior to excavation operations. The mixing system 500 may be configured so that it is removable from the tank 102, if desired.

In alternative embodiments, the mixing system 500 may comprise differently shaped or sized features or different arrangements of the features so long as the system 500 operates to effectively mix the material 160 and the drying agent 406 within tank 106. For example, the paddle elements 522 and paddles 552 may have different shapes or sizes other than those described herein. As another example, the mixing system may comprise inner and outer paddle assemblies attached to the shaft in an alternating pattern. The outer paddle assemblies may have a greater length than the inner paddle assemblies such that the outer paddle assemblies circumscribe a path near the bottom of the tank, while the inner paddle assemblies circumscribe a path near the center of the tank. Other means known in the art may also be used to mix the drying agent 406 and material 160 within the tank 102.

In operation, activation of the motor 514 and rotation of the shaft 502 and paddle assemblies 504 and 550 may be initiated in response to human input on the display device 600, shown in FIG. 20. The motor 514 may be automatically activated in response to the processor being notified that all the drying agent 406 has been added to the tank 102.

Once the mixing system 500 is activated, the mixing operation is monitored to determine when the drying agent 406 has effectively converted the material within the tank into solidified batch of material.

Monitoring the Progress of the Mixing Procedure

One method of monitoring the mixing operation is to view the material 160 through a site glass or hatch. However, it may be difficult to get a clear view of the interior of the tank 102.

Continuing with FIG. 16, another method of monitoring the mixing operation is to monitor the torque applied to the shaft 502 by the motor 514. For an electric motor, the torque may be monitored by an electric current measuring sensor. For a hydraulic motor, a hydraulic pressure transducer may be on the inlet side of the hydraulic motor. The sensor or transducer communicate with the processor.

If the material 160 within the tank 102 still contains a substantial amount of liquid material 162, the torque required to turn the paddles assemblies 504 and 550 is low. Once drying agent 406 is added to the tank 102, the torque will begin to rise as the material 160 thickens, as shown by the exemplary graph in FIG. 19. The mixing system 500 will continue to rotate until a torque value consistent with a solidified batch of material 160 is reached. As the material approaches a solidified state, the torque required to turn the paddle assemblies 504 may rise to the point that the motor is no longer able to turn the paddle assemblies 504 within the tank. At this point, the drive motor 514 will stall, as indicated in FIG. 19.

Figure 19:
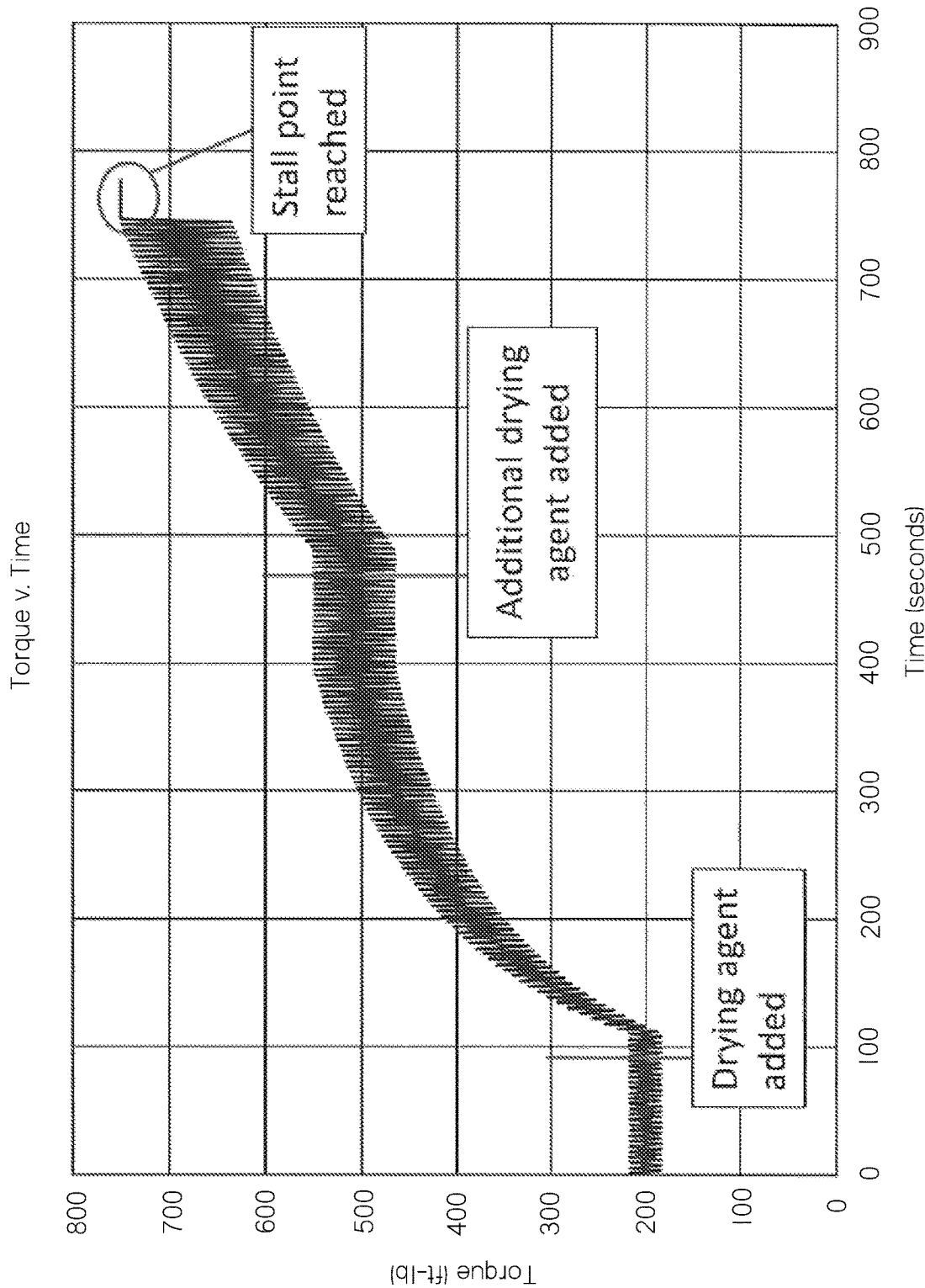
FIG. 19 is a graph depicting the torque applied over time by a motor included in the mixing system shown in FIG. 16.

If the torque has not risen to a level consistent with a solidified batch of material 160, additional drying agent may need to be added to the tank 102, as shown for example in the graph in FIG. 19. Following the addition of more drying agent to the tank 102, the torque applied to the mixing system 500 by the motor 514 is monitored until the stall point is reached.

In operation, the motor 514 may be configured to automatically shut down once the stall point is reached. For example, the controller may shut down the motor in response to the processor's analysis of received torque values. Such action may be accomplished by adjusting the pressure relief for the hydraulic motor drive, or by setting a current limit for an electric motor drive. The desired stall point may be set based on the moisture content of the material 160 in the tank 102, the properties of the solid material 164 in the tank 102, and the initial torque value. The processor may alert the operator on the display device 600 once the "stall point" is reached.

Automation

With reference to FIG. 20, as discussed herein, the individual steps of the overall method may be performed automatically in response to human input on the display device 600. For example, the display device 600 could have an "Initiate" or "Start" command. The electronic controller could then move the vacuum excavation unit 100 and apparatuses described herein through each one of the steps required to gain the needed information.

In some embodiments, human input on the display device 600 may be required to start each step. In other embodiments, two or more steps may be performed consecutively in response to a human input on the display device 600.

As discussed, the gathered information could be displayed on the display device 600, as shown in FIG. 20. The operator may vary what information is shown on the display device 600, as desired. Once the gathered information is made available to the operator, the operator can make decisions about when to add the drying agent and can monitor the mixing operation on the display device 600.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A method for processing material contained within an interior of a vacuum tank, the method comprising the steps of:
   determining a weight of the material within the tank;
   determining an amount of open volume within the tank;
   after the preceding step, calculating a moisture content of the material using the determined weight of the material and the determined amount of open volume;
   after the preceding step, calculating an amount of drying agent needed to convert the material within the tank into a solidified batch of material using the calculated moisture content;
   after the preceding step, adding the calculated amount of drying agent to the tank; and
   after the preceding step, rotating a shaft supported within the vacuum tank between opposed ends of the tank, thereby mixing the drying agent with the material.

2. The method of claim 1, in which the step of determining the amount of open volume within the tank comprises:
   allowing ambient air outside of the tank to enter the interior of the tank through a pipe section having a known diameter;
   recording an amount of time required for air pressure within the tank to rise from a first predetermined pressure value to a second predetermined pressure value; and
   calculating the amount of open volume using the recorded amount of time and the known diameter of the pipe section.

3. The method of claim 1, in which the step of determining the amount of open volume within the tank comprises:
   allowing air within the interior of the tank to escape the tank through a pipe section having a known diameter;
   recording an amount of time required for air pressure within the tank to drop from a first predetermined pressure value to a second predetermined pressure value; and
   calculating the amount of open volume using the recorded amount of time and the known diameter of the pipe section.

4. The method of claim 1, in which the step of determining the amount of open volume within the tank comprises:
   exciting air contained within a pipe section attached to the tank and in communication with the interior of the tank, the air having a known mass;
   recording a frequency at which the excited air resonates; and
   calculating the amount of open volume using the recorded frequency and the known mass of the air.

5. The method of claim 1, in which the step of calculating the moisture content of the material comprises:
   calculating a volume of the material within the tank using the determined open volume within the tank;
   calculating a density of the material within the tank using the determined weight of the material and the calculated volume of the material within the tank; and
   using the calculated density, the determined weight, and the calculated volume of the material within the tank to calculate the moisture content of the material.

6. The method of claim 1, in which the step of adding the calculated amount of drying agent to the tank comprises:
   transferring the drying agent from a stationary position outside of the tank to the interior of the tank using a delivery system that interconnects the drying agent and the interior of the tank.

7. The method of claim 6, in which the delivery system comprises an apparatus housing the drying agent, and a hose interconnecting the apparatus and the interior of the tank, and in which the transferring step comprises:
   drawing the drying agent from the apparatus and into the interior of the tank using the hose.

8. The method of claim 1,
   wherein the shaft rigidly supports a plurality of paddles configured to rotate with the shaft.

9. The method of claim 1, in which the recited steps are performed in response to a human input on a display device.

10. A method for processing material contained within an interior of a vacuum tank, in which the vacuum tank has opposed ends; in which the tank is pivotable at one of its ends about a pivot point, the method comprising the steps of:
    determining a weight of the material within the tank; in which the step of determining the weight of the material contained within the tank comprises:
       using a vertical load measuring device to measure a vertical force applied to the tank at the pivot point; and
       calculating the weight of the material contained within the tank using the measured vertical force and a known weight of the tank;
    determining an amount of open volume within the tank;
    after the preceding step, calculating a moisture content of the material using the determined weight of the material and the determined amount of open volume;
    after the preceding step, calculating an amount of drying agent needed to convert the material within the tank into a solidified batch of material using the calculated moisture content;
    after the preceding step, adding the calculated amount of drying agent to the tank; and
    after the preceding step, mixing the drying agent with the material.

11. The method of claim 10, in which the vertical load measuring device is a deflection based sensor.

12. A method for processing material contained within an interior of a vacuum tank, the method comprising the steps of:
    determining a weight of the material within the tank;
    determining an amount of open volume within the tank;
    after the preceding step, calculating a moisture content of the material using the determined weight of the material and the determined amount of open volume;
    after the preceding step, calculating an amount of drying agent needed to convert the material within the tank into a solidified batch of material using the calculated moisture content;
    after the preceding step, adding the calculated amount of drying agent to the tank;

after the preceding step, mixing the drying agent with the material;

measuring an amount of torque required to mix the drying agent with the material; and stopping the mixing of the drying agent and the material upon the measured amount of torque reaching a predetermined value.

13. A method for processing material contained within an interior of a vacuum tank, the tank being pivotable about first and second pivot points, the method comprising:

measuring an amount of vertical force applied to the tank at the first and second pivot points;

communicating the measured amounts of vertical force to a processor;

using the processor to calculate a weight of the material within the tank using the measured amounts of vertical force;

recording an amount of time required for air pressure within the interior of the tank to move between two predetermined values;

communicating the recorded amount of time to the processor;

using the processor to calculate an amount of open volume within the tank using the recorded amount of time;

using the processor to calculate a moisture content of the material within the tank using the previously calculated values;

using the processor to calculate an amount of drying agent needed to convert the material within the tank into a solidified batch of material;

displaying the values calculated by the processor on a display device in communication with the processor; and adding the calculated amount of drying agent to the tank.

14. The method of claim 13, further comprising:

rotating a shaft supported within the tank and extending between the opposed ends of the tank, the shaft rigidly supporting a plurality of paddle assemblies configured to rotate with the shaft;

measuring an amount of torque required to rotate the shaft;

communicating the measured amount of torque to the processor; and stopping rotation of the shaft upon the amount of torque measured reaching a predetermined value.

15. The method of claim 14, in which the step of adding the calculated amount of drying agent to the tank comprises:

drawing the drying agent from an apparatus positioned outside of the tank and into the interior of the tank using a hose, the hose interconnecting the apparatus and the interior of the tank.

16. A system, comprising:

a vacuum tank having opposed ends and pivotable at one of its ends about a pivot point;

a material contained within the tank;

a vertical load measuring device configured to be supported at the pivot point;

a pipe section having a known diameter and in selective communication with the interior of the tank;

one or more sensors in communication with the interior of the tank;

a processor in communication with the vertical load measuring device and the one or more sensors, the processor configured to calculate a weight of the material within the tank using a value measured by the vertical load measuring device, configured to calculate an amount of open volume within the tank using values measured by the one or more sensors and the known diameter of the pipe section, and configured to calculate a moisture content of the material within the tank using the previously calculated values; and a display device in communication with the processor and configured to display the values calculated by the processor for a human user of the system.

17. The system of claim 16, further comprising:

an apparatus positioned outside of the tank and housing a drying agent; and a delivery device configured to transfer the drying agent from the apparatus to the interior of the tank.

18. The system of claim 16, further comprising:

a shaft supported within the tank and extending between the opposed ends of the tank;

a plurality of paddle assemblies rigidly attached to the shaft;

a motor mechanically coupled to the shaft; and a torque sensor in communication with the processor and the motor;

in which the processor is further configured to analyze values measured by the torque sensor.

19. The system of claim 18, in which each of the plurality of paddle assemblies comprises:

an elongate arm having a first section and a second section, in which the first section has a greater length than the second section;

a first paddle element supported on the first section; and a second paddle element supported on the second section;

in which the first section circumscribes a longer path than the second section.

20. The system of claim 16, in which the one or more sensors comprise a pressure sensor.

* * * * *